United States Patent
Jose et al.

(10) Patent No.: US 9,462,581 B2
(45) Date of Patent: Oct. 4, 2016

(54) METHODS AND APPARATUS FOR SYNCHRONOUSLY CODED SUBCARRIERS IN OFDMA SYSTEMS

(71) Applicant: QUALCOMM Incorporated, San Diego, CA (US)

(72) Inventors: Jubin Jose, Bound Brook, NJ (US); Xinzhou Wu, Hillsborough, NJ (US); Sundar Subramanian, Bridgewater, NJ (US); Junyi Li, Chester, NJ (US); Thomas Joseph Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 663 days.

(21) Appl. No.: 13/653,274

(22) Filed: Oct. 16, 2012

(65) Prior Publication Data
US 2014/0105120 A1    Apr. 17, 2014

(51) Int. Cl.
H04W 72/04 (2009.01)
H04B 7/04 (2006.01)
H04W 28/06 (2009.01)
H04B 7/06 (2006.01)

(52) U.S. Cl.
CPC ......... *H04W 72/042* (2013.01); *H04B 7/0452* (2013.01); *H04B 7/0619* (2013.01); *H04B 7/0456* (2013.01); *H04B 7/0617* (2013.01); *H04W 28/06* (2013.01)

(58) Field of Classification Search
CPC   H04W 48/18; H04W 72/02; H04W 72/1263
USPC ........................................ 370/310, 328, 329
See application file for complete search history.

(56) References Cited

U.S. PATENT DOCUMENTS

| | | | |
|---|---|---|---|
| 7,729,432 B2 | 6/2010 | Khan et al. | |
| 7,768,984 B2 | 8/2010 | Lee et al. | |
| 7,787,546 B2 | 8/2010 | Khan | |
| 7,983,622 B1* | 7/2011 | Vaughan | 455/67.16 |
| 8,036,098 B2 | 10/2011 | Pereira et al. | |
| 2004/0146003 A1* | 7/2004 | Schaefer et al. | 370/206 |
| 2005/0037718 A1* | 2/2005 | Kim et al. | 455/101 |
| 2007/0082619 A1 | 4/2007 | Zhang et al. | |

(Continued)

FOREIGN PATENT DOCUMENTS

KR    2012034973 A    4/2012

OTHER PUBLICATIONS

International Search Report and Written Opinion—PCT/US2013/064217—ISA/EPO—Jan. 14, 2014.

(Continued)

*Primary Examiner* — Siming Liu
(74) *Attorney, Agent, or Firm* — Nerrie M. Zohn

(57) ABSTRACT

A method, an apparatus, and a computer program product for wireless communication are provided. The apparatus may be a serving base station. The serving base station receives channel feedback from a plurality of UEs. The channel feedback is based on predetermined phase rotations used by the serving base station. The serving base station selects at least one UE of the UEs for a data transmission based on the received channel feedback. The serving base station maps at least one data stream to a set of resource blocks. The serving base station transmits the set of resource blocks to the at least one UE with a phase rotation determined based on the predetermined phase rotations.

49 Claims, 17 Drawing Sheets

(56) References Cited

U.S. PATENT DOCUMENTS

| | | |
|---|---|---|
| 2008/0285477 A1 | 11/2008 | Kuroda et al. |
| 2009/0052566 A1 | 2/2009 | Maltsev et al. |
| 2009/0247086 A1 | 10/2009 | Lin et al. |
| 2010/0226293 A1 | 9/2010 | Kim et al. |
| 2010/0227613 A1 | 9/2010 | Kim et al. |
| 2010/0227635 A1 | 9/2010 | Kim et al. |
| 2010/0227637 A1 | 9/2010 | Kwon et al. |
| 2010/0246515 A1 | 9/2010 | Tsai et al. |
| 2010/0248712 A1 | 9/2010 | Lee et al. |
| 2010/0291938 A1 | 11/2010 | Jang |
| 2011/0002406 A1* | 1/2011 | Ming et al. .......... 375/260 |
| 2011/0059765 A1 | 3/2011 | Kim et al. |
| 2011/0090882 A1 | 4/2011 | Lee et al. |
| 2011/0141926 A1 | 6/2011 | Damnjanovic et al. |
| 2011/0177834 A1 | 7/2011 | Shin et al. |
| 2011/0305286 A1 | 12/2011 | Shimezawa et al. |
| 2012/0040706 A1 | 2/2012 | Shin et al. |
| 2012/0062421 A1 | 3/2012 | Su et al. |
| 2012/0077485 A1 | 3/2012 | Shin et al. |
| 2012/0077511 A1 | 3/2012 | Shin et al. |
| 2012/0122502 A1 | 5/2012 | Shin et al. |
| 2012/0170442 A1 | 7/2012 | Razaviyayn et al. |
| 2012/0178482 A1 | 7/2012 | Seo et al. |
| 2012/0269077 A1 | 10/2012 | Bazzi et al. |
| 2012/0281780 A1 | 11/2012 | Huang et al. |
| 2012/0307929 A1 | 12/2012 | Seo et al. |
| 2013/0157705 A1 | 6/2013 | Kwon et al. |
| 2013/0295944 A1* | 11/2013 | Saur et al. .......... H04W 16/28 455/450 |
| 2013/0344908 A1 | 12/2013 | Hwang |
| 2014/0094164 A1 | 4/2014 | Hwang et al. |
| 2014/0105121 A1 | 4/2014 | Jose et al. |
| 2014/0200010 A1 | 7/2014 | Jose et al. |
| 2014/0204773 A1 | 7/2014 | Jose et al. |

OTHER PUBLICATIONS

Larsson P, et al., "Multiuser diversity forwarding in multihop packet radio networks" IEEE Wireless Communications and Networking Conference, vol. 4, Mar. 13, 2005, pp. 2188-2194, XP010791518 IEEE, Piscataway, NJ, USA 001: 10.1109/WCNC. 2005.

Jung, et al., "Opportunistic Interference Mitigation Achieves Optimal Degrees-of-Freedom in Wireless Multi-Cell Uplink Networks", IEEE Transactions on Communications, vol. 60, No. 7, Jul. 2012, 10pgs.

Khan, et al., "Interference-Driven Linear Precoding in Multiuser MISO Downlink Cognitive Radio Network", Vehicular Technology, IEEE Transactions, vol. 61, Issue: 6, Jul. 2012, pp. 2531-2543.

Tang, et al., "Opportunistic MIMO Multi-Cell Interference Alignment Techniques", Internet Multimedia Systems Architecture and Application (IMSAA), 2011 IEEE 5th International Conference, Dec. 2011, 4 pgs.

Jung B.C., et al., "Opportunistic Interference Alignment for Interference—Limited Cellular TDD Uplink", IEEE Communications Letters, IEEE Service Center, Piscataway, MJ, US, vol. 15, No. 2, Feb. 1, 2011, pp. 148-150, XP011345749, ISSN: 1089-7798, DOI: 10.1109/ LCOMM .2011.1213 10.101439 p. 148, right-hand column, line 13-line 17 p. 149, left-hand column, line 8-line 10, III OIA in cellular networks.

Reza B: "Mobile Computing Principles", Nov. 1, 2004, Cambridge University Press, Cambridge, UK ISBN: 0521817331, pp. 635-635.

* cited by examiner

METHODS AND APPARATUS FOR SYNCHRONOUSLY CODED SUBCARRIERS IN OFDMA SYSTEMS

BACKGROUND

1. Field

The present disclosure relates generally to communication systems, and more particularly, to synchronously coded subcarriers in orthogonal frequency division multiple access (OFDMA) systems.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, OFDMA systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus may be a serving base station. The serving base station receives channel feedback from a plurality of user equipments (UEs). The channel feedback is based on predetermined phase rotations used by the serving base station. The serving base station selects at least one UE of the UEs for a data transmission based on the received channel feedback. The serving base station maps at least one data stream to a set of resource blocks. The serving base station transmits the set of resource blocks to the at least one UE with a phase rotation determined based on the predetermined phase rotations.

DETAILED DESCRIPTION

Figure 1:
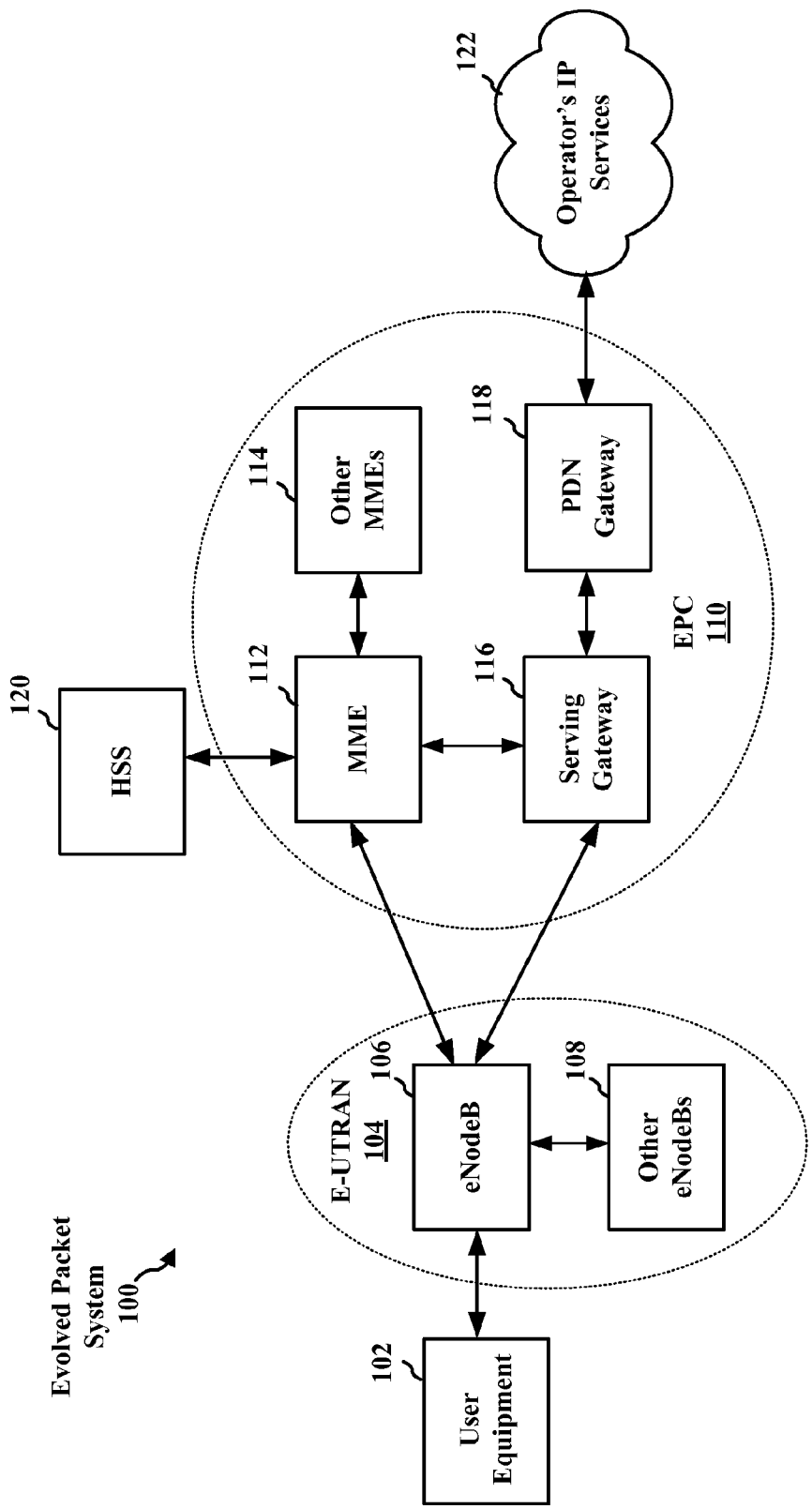
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS).

Figure 2:
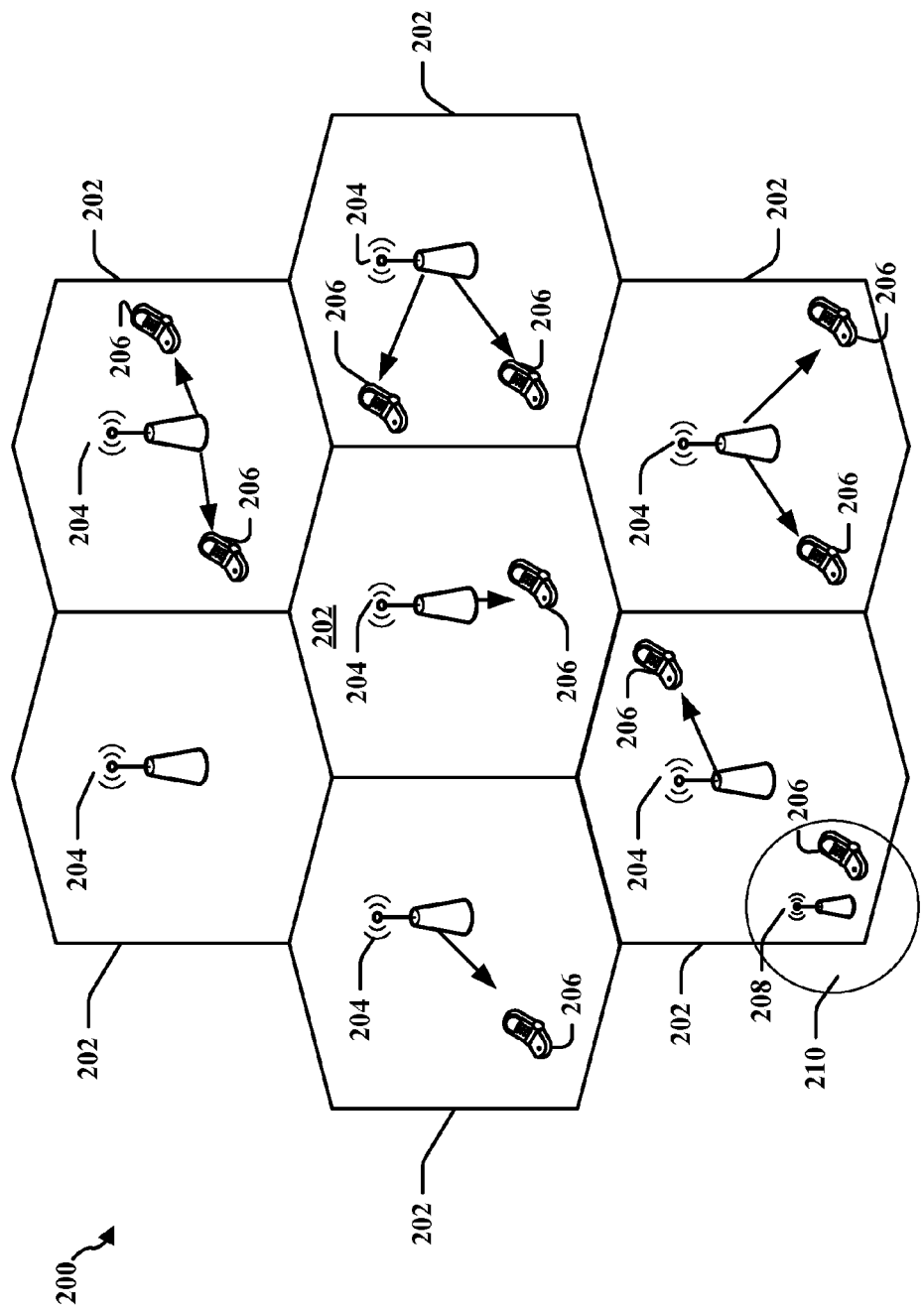
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
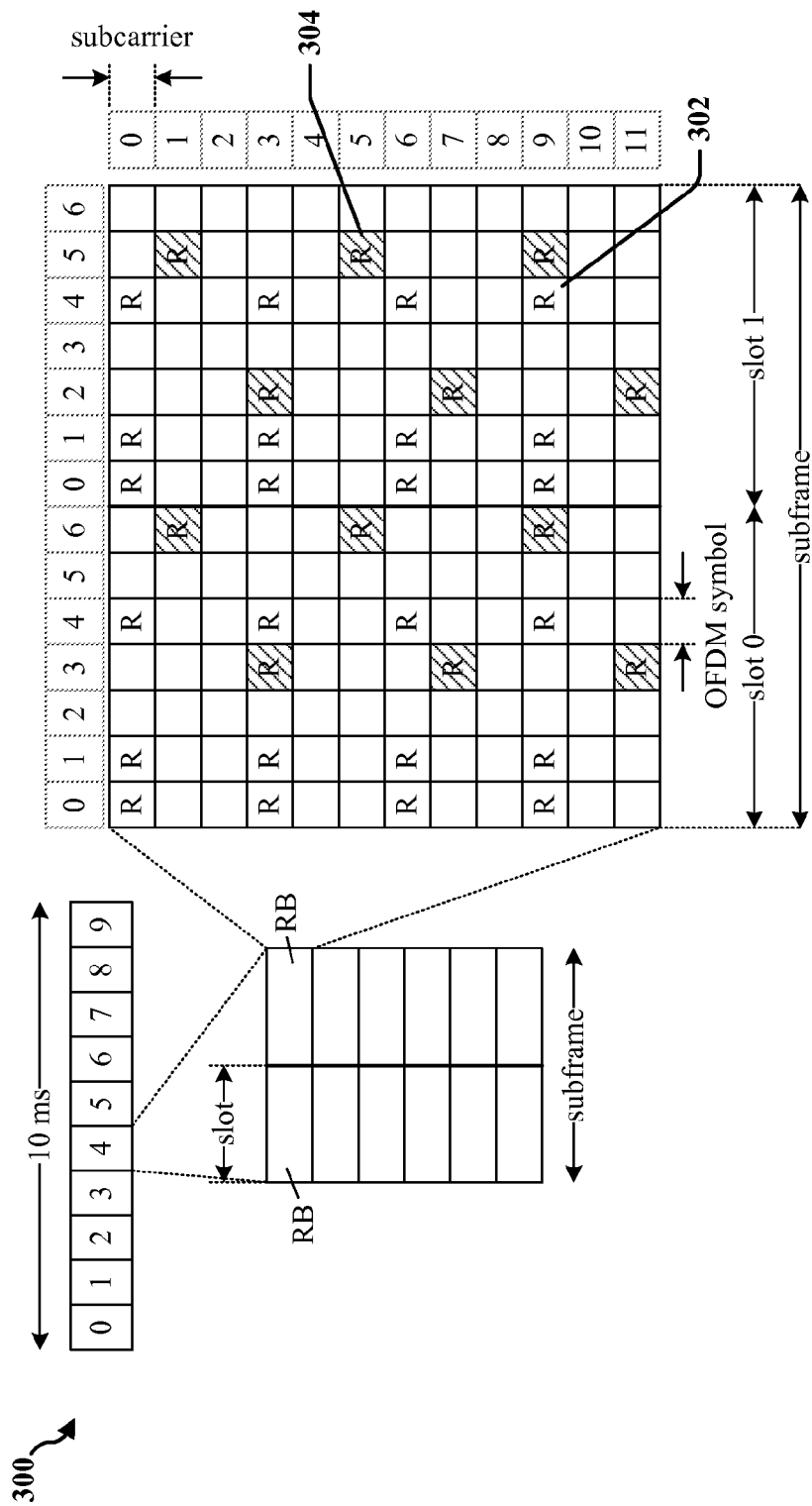
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
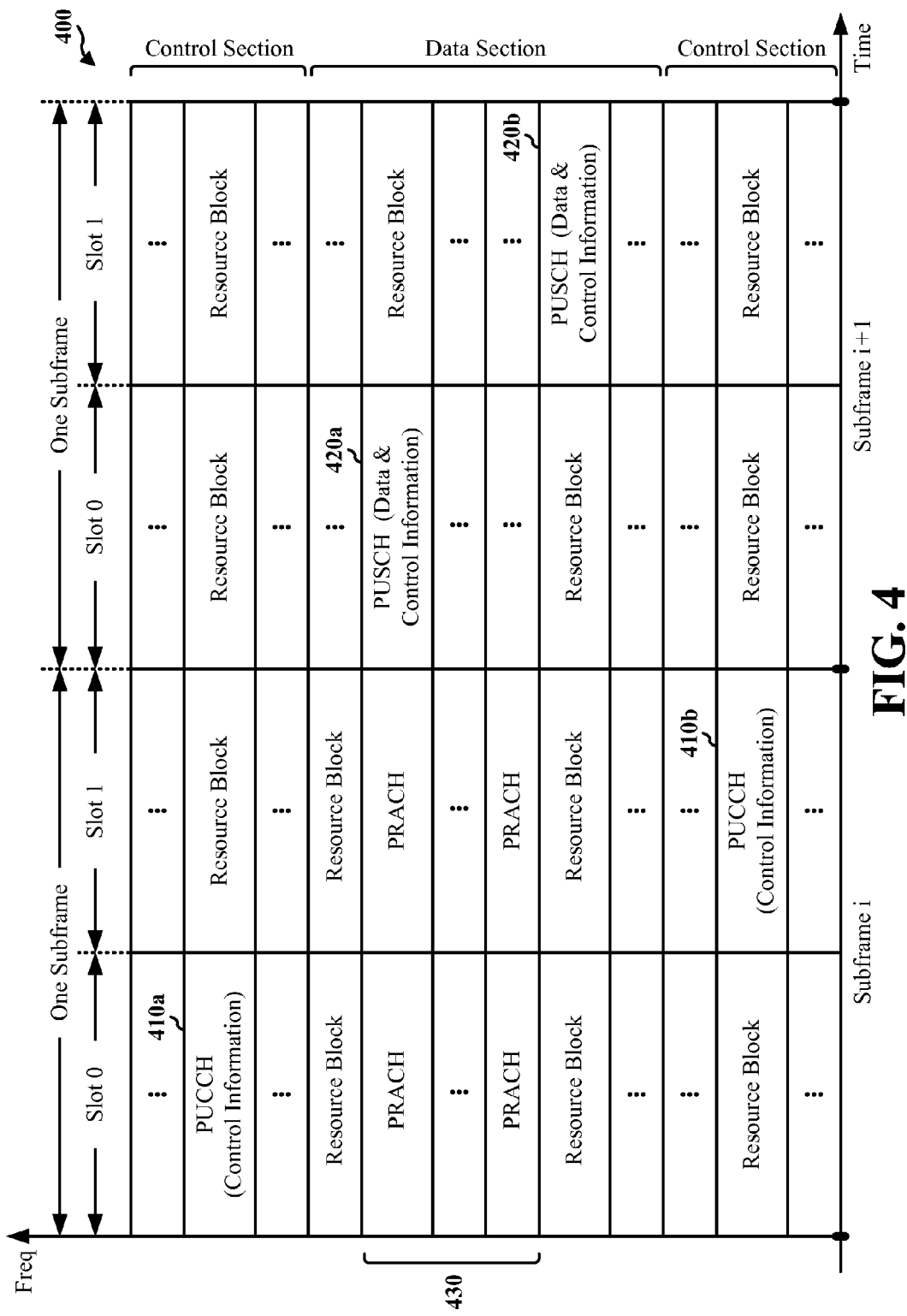
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
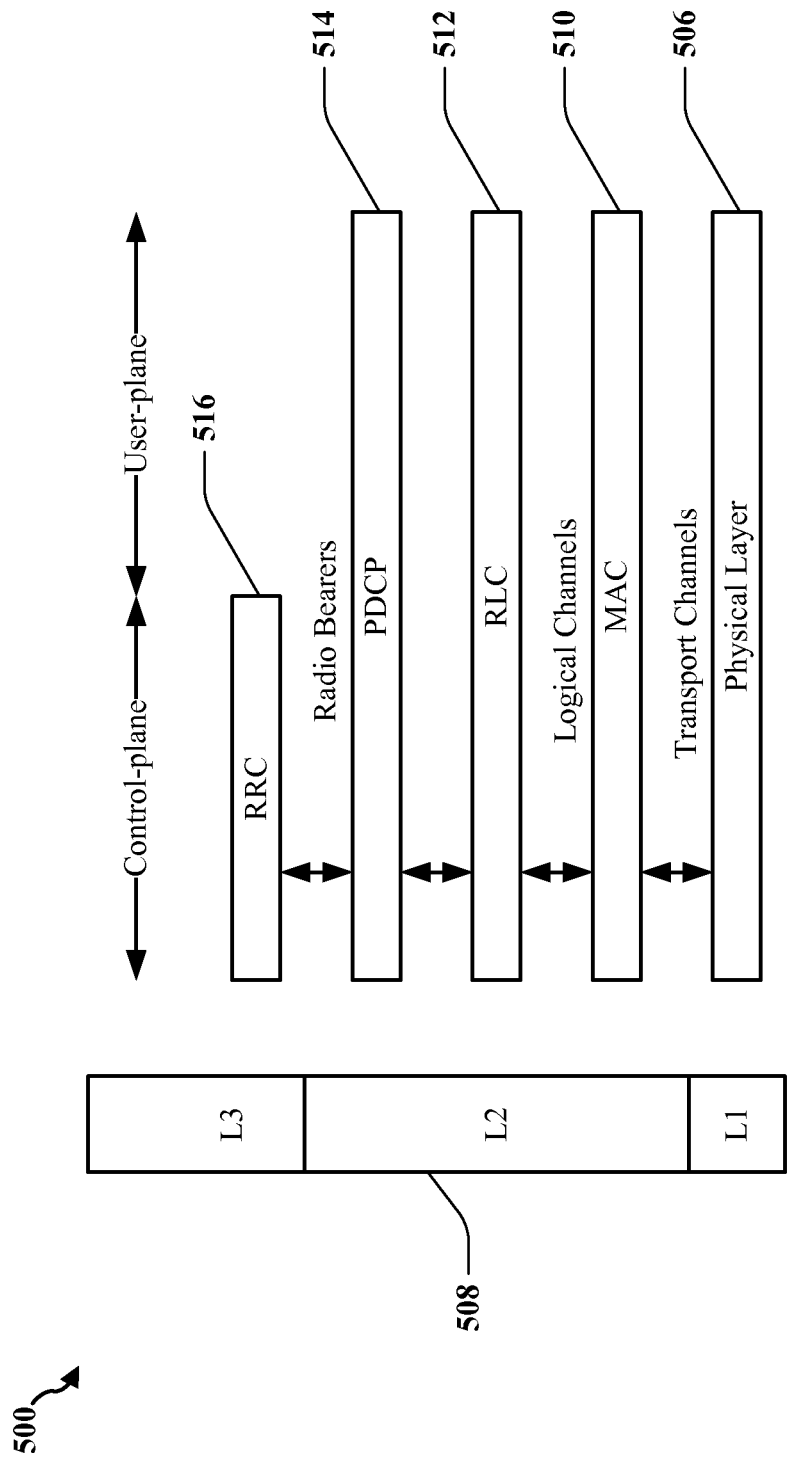
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
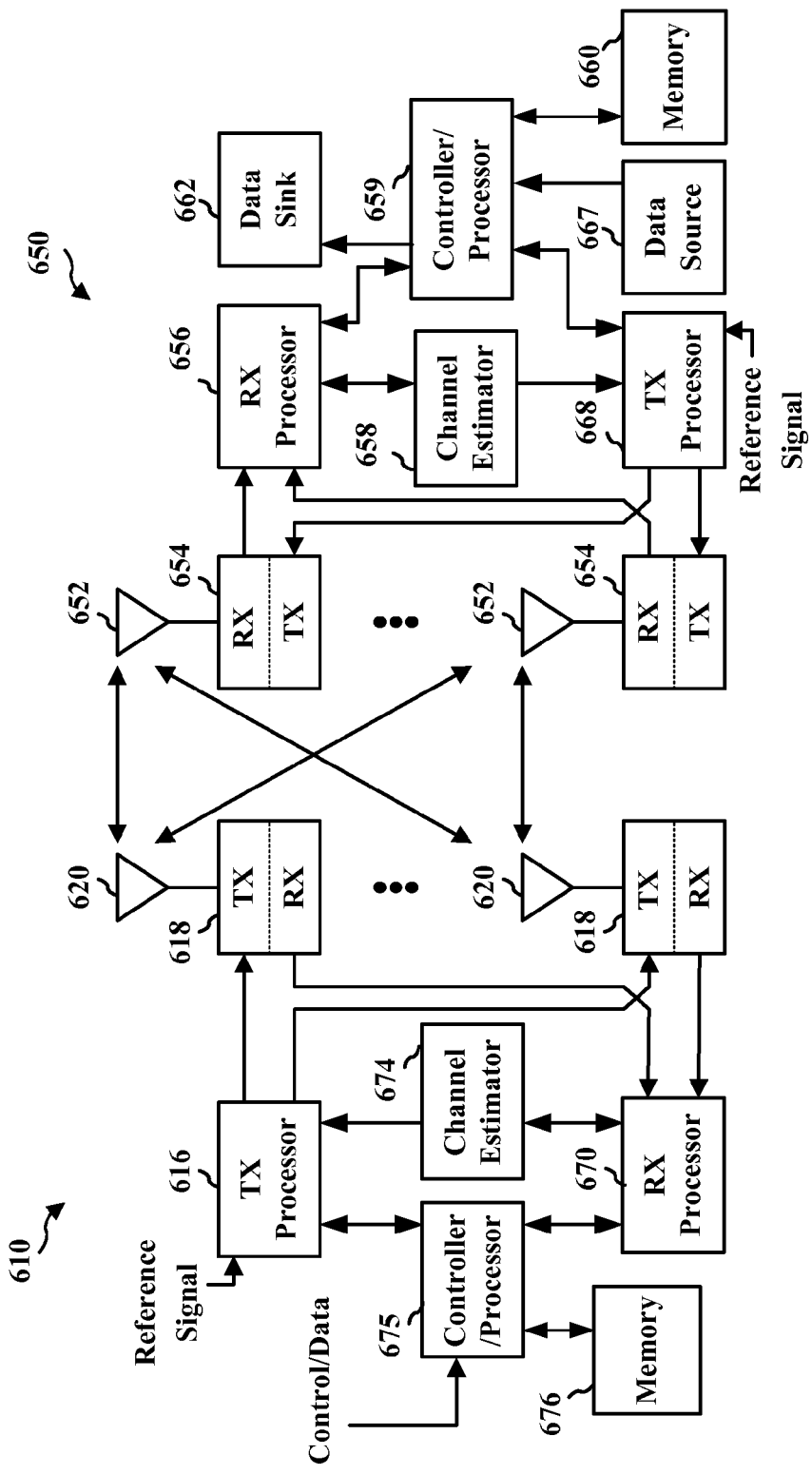
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

In traditional synchronous OFDMA systems such as downlink cellular systems, the net interference from neighboring eNBs is a serious impairment, especially for cell-edge UEs. Techniques to reduce the interference typically involve the reduction of interference at the UEs by preventing certain simultaneous transmissions (e.g., by one or multiple eNBs), leading to a reduced net interference. An alternate technique is to reduce the net interference that is received at a selected UE even though there are simultaneous transmissions. Such a technique involves controlling the transmissions such that the interference from adjacent eNBs "align" at some of the UEs and performing an appropriate UE combining operation so as to improve the received signal to interference plus noise ratio (SINR). Typically, such a technique may involve the communication of detailed channel state information between all transmit receive pairs, and therefore will have high overhead. There is currently a need for a scheme that does not have significant channel state communication overhead while still providing significant advantages of aligning the interference.

Figure 7:
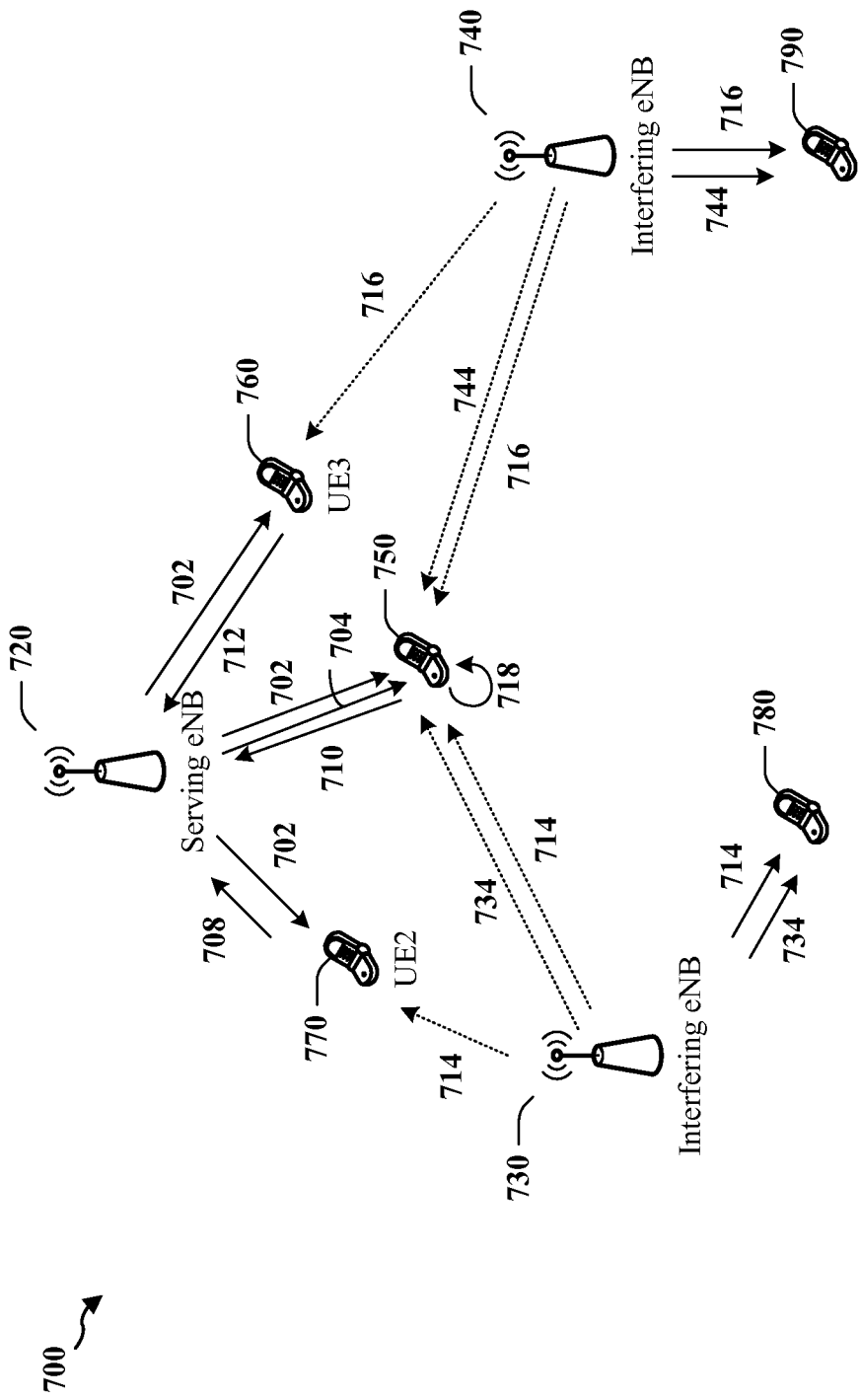
FIG. 7 is a first diagram for illustrating exemplary methods.

FIG. 7 is a first diagram 700 for illustrating exemplary methods. The UE 750 determines 718 a predetermined linear mapping used by the serving eNB 720 and the interfering eNBs 730, 740 for mapping data to resource blocks and/or for selecting transmit antennas or a number of transmit antennas for transmitting data. The UE 750 also determines 718 one or more predetermined pseudo-random phase rotations applied by the serving eNB 720 and the interfering eNBs 730, 740 to a subsequent data transmission using the predetermined mapping. The serving eNB 720 transmits pilot signals 702 to the UEs 750, 760, 770. The UEs 750, 760, 770 receive the pilots signals 702 from the serving eNB 720 and also the pilot signals 714 from the interfering eNB 730 that the interfering eNB 730 transmits to the UE 780 and the pilot signals 716 from the interfering eNB 740 that the interfering eNB 740 transmits to the UE 790. Based on the received pilot signals 702, 714, 716, the determined mapping and phase rotations utilized by the serving eNB 720 and interfering eNBs 730, 740, and a filter (e.g., a minimum mean-square-error (MMSE) filter or a maximal ratio-combining matched filter), the UE 750 determines channel feedback. The channel feedback may be a signal strength or a signal quality, such as a channel quality indicator (CQI), an SINR, a reference signal received quality (RSRQ), a reference signal received power (RSRP), a received signal strength indicator (RSSI), or the like. The UE 750 transmits the channel feedback 710 to the serving eNB 720. In addition, the UE 760 transmits channel feedback 712 to the serving eNB 720 and the UE 770 transmits channel feedback 708 to the serving eNB 720. Based on the received channel feedback 708, 710, 712, the serving eNB 720 selects one of the UEs for a data transmission 704. Assume based on the received channel feedback 708, 710, 712 that the serving eNB 720 selects the UE 750 for the data transmission 704.

In a first configuration, the serving eNB 720 maps at least one data stream, which would normally map to n resource blocks, to m resource blocks, where m>n. Accordingly, additional redundancy is added after the data is modulated. This redundancy is in addition to any redundancy the serving eNB 720 adds before the data is modulated into data symbols. The mapping is based on the predetermined mapping known a priori by the UE 750. The serving eNB 720 rotates a phase of the modulated symbols in resource elements carrying data in the m resource blocks based on the predetermined phase rotation known a priori by the UE 750. Subsequently, the serving eNB 720 transmits the m resource blocks to the UE 750 in the data transmission 704.

For example, the serving eNB 720 may map at least one data stream, which would normally map to two resource blocks, to four resource blocks (therefore duplicating the data). The serving eNB 720 may rotate a phase of the modulated symbols in two of the resource blocks corresponding to a first phase rotation and may rotate a phase of the modulated symbols in the remaining two resource blocks corresponding to a second phase rotation. The first and second phase rotations are normally different and one of the first and second phase rotations may be zero. The serving eNB 720 may then transmit the four resource blocks to the UE 750 in the data transmission 704. The interfering eNBs 730, 740 also may send data transmissions 734, 744, respectively, to the UEs 780, 790, respectively, on the same m resource blocks (i.e., same OFDM symbols and subcarriers at the same time). The interfering eNBs 730, 740 send the data transmissions 734, 744 using the same predetermined mapping onto the same resource blocks. The interfering eNBs 730, 740 apply their own predetermined phase rotations to the data transmissions 734, 744. The applied phase rotations of each of the serving eNB 720, the interfering eNB 730, and the interfering eNB 740 are normally different. The predetermined phase rotations applied by the interfering eNBs are also known a priori by the UE 750.

In a second configuration, the serving eNB 720 maps at least one data stream to n resource blocks. As such, the serving eNB 720 does not add any additional redundancy to the modulated data when mapping the modulated data symbols to resource blocks. Instead, based on a predetermined mapping known a priori to the UE 750, the serving eNB 720 selects a set of transmit antennas or a number of transmit antennas for sending the data transmission 704 using MIMO. In each of the selected transmit antennas, the serving eNB 720 rotates a phase of each modulated symbol in the n resource blocks corresponding to the predetermined pseudo-random phase rotation known a priori to the UE 750. The interfering eNBs 730, 740 send the data transmissions 734, 744 on the same n resource blocks (i.e., same OFDM symbols and subcarriers at the same time) using the same predetermined mapping. For example, assume the serving eNB 720 has four antennas $A_1$, $A_2$, $A_3$, and $A_4$, and that the serving eNB 720 duplicates the data as provided by the predetermined mapping known a priori by the UE 750. The serving eNB 720 may transmit the n resource blocks through the transmit antenna including antennas $A_1$ and $A_2$ after applying a first phase rotation to the modulated data symbols in the n resource blocks, and may transmit the same n resource blocks through the transmit antenna including antennas $A_3$ and $A_4$ after applying a second phase rotation to the modulated data symbols in the n resource blocks.

The UE 750 receives the data transmission 704 along with the data transmission 734 from the interfering eNB 730 and the data transmission 744 from the interfering eNB 740. The received data transmission 704 has a power gain due to the repetition of the data. The UE 750 decodes the data based on the filter, the received pilot signals 702, 714, 716, and the predetermined mapping and phase rotations of the serving eNB and interfering eNBs used to determine the channel feedback. The UE 750 may decode each stream individually or may use joint decoding to jointly decode all of the received streams. When using joint decoding, the UE 750 uses the linear map information. If both direct and indirect channel estimates are available to the UE 750, the UE 750 may use an MMSE filter for computing the channel feedback and decoding the data. If only direct channel estimates are available to the UE 750, the UE 750 may use a maximal ratio-combining matched filter for computing the channel feedback and decoding the data.

Figure 8:
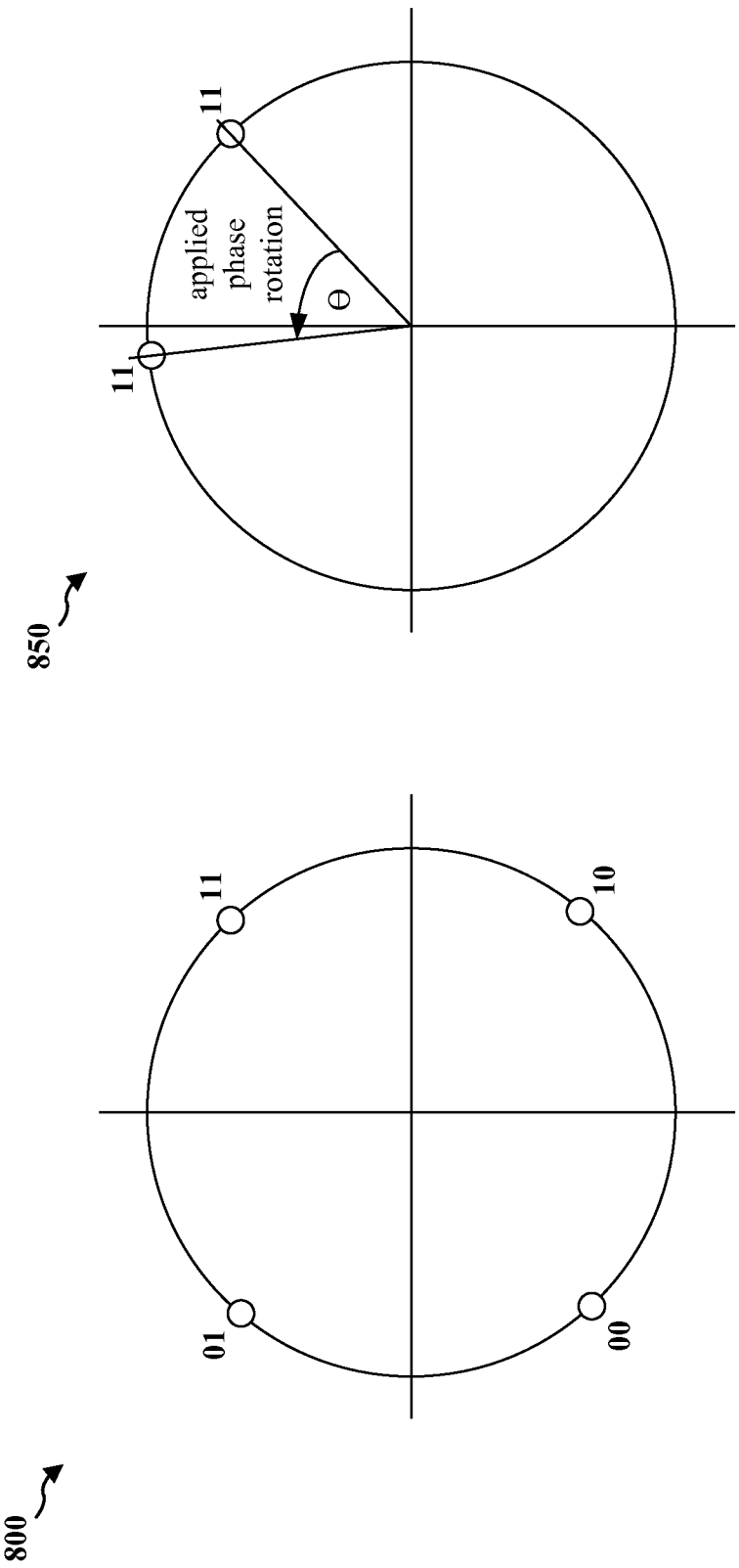
FIG. 8 is a second diagram for illustrating exemplary methods.

FIG. 8 is a second diagram for illustrating exemplary methods. FIG. 8 specifically illustrates the phase rotation of a modulated symbol. Assume the serving eNB 720 modulates the data using QPSK. The diagram 800 illustrates possible QPSK values. As shown in the diagram 850, if the serving eNB 720 applies a phase rotation to the QPSK value 11, the serving eNB 720 may rotate a phase of the modulated symbol by θ. The value θ is the predetermined phase rotation known a priori by the UE 750. Accordingly, in the first configuration (non-MIMO), the serving eNB 720 may apply a first phase rotation $\theta_1$ to modulated data symbols in a first subset of the m resource blocks and a second phase rotation $\theta_2$ to modulated data symbols in a second subset of the m resource blocks. More generally, the serving eNB 720 may apply a first phase rotation $\theta_1$ to modulated data symbols in a first subset of resource elements in the m resource blocks and a second phase rotation $\theta_2$ to modulated data symbols in a second subset (different than the first subset) of resource elements in the m resource blocks. As such, in any particular resource block, both phase rotations $\theta_1$, $\theta_2$ may be applied because the first subset of resource elements and the second subset of resource elements may both include resource elements within the same resource block.

Each eNB may use different pseudo-random sequences or seeds when applying phase rotations. As such, the applied phase rotations for each eNB may hop around to different values. The applied phase rotation may be dependent on an identifier of the eNB, subcarriers of the utilized resource blocks, or a subframe and/or system frame number in which the mapping or the phase rotations apply. When the applied phase rotation depends on the subframe and/or on a system frame number in which the mapping and phase rotations apply, the applied phase rotation may be said to be time-varying.

Figure 9:
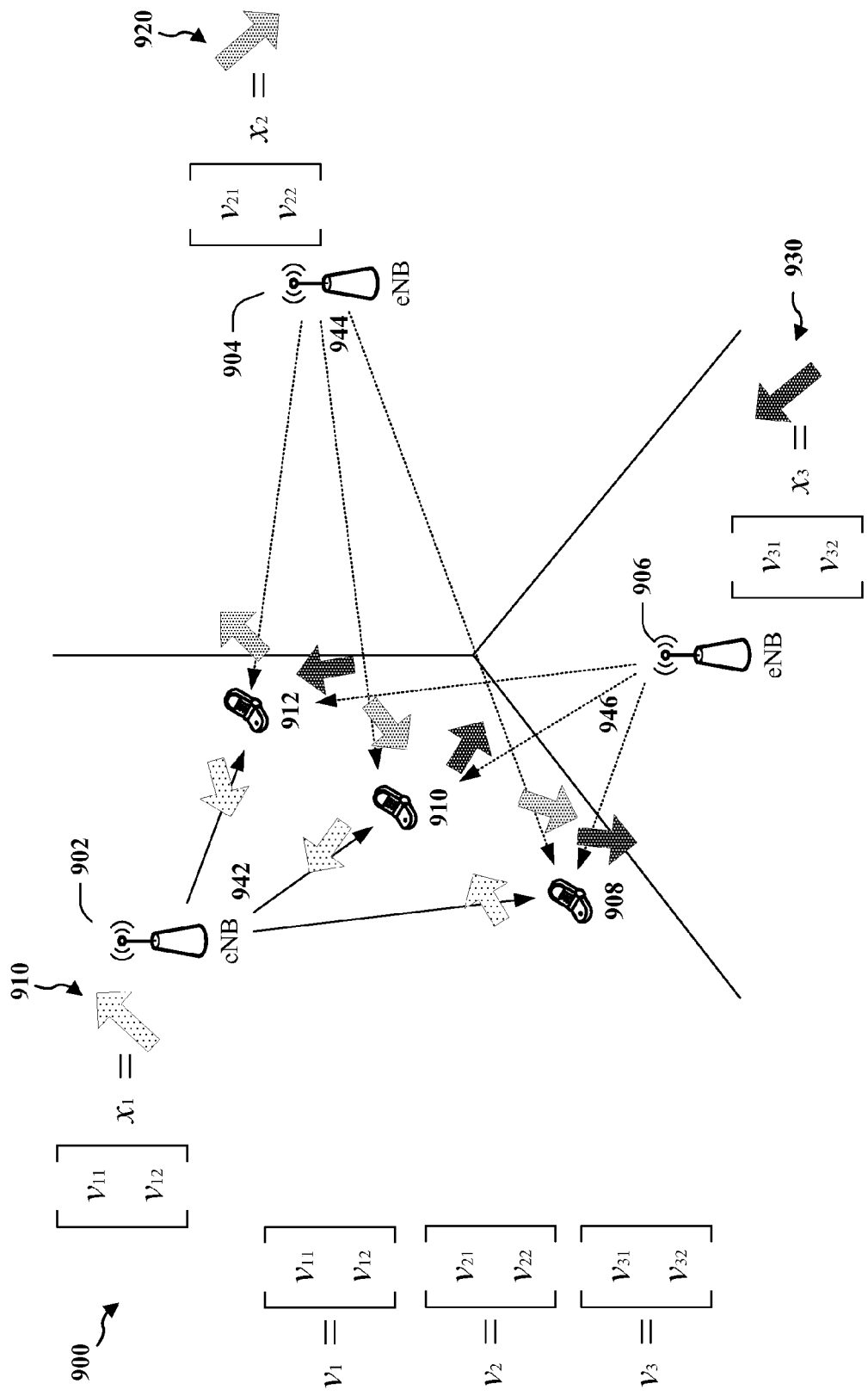
FIG. 9 is a third diagram for illustrating exemplary methods.

FIG. 9 is a third diagram 900 for illustrating exemplary methods. As shown in FIG. 9, each of the eNBs 902, 904, 906 apply a direction vector v to a modulated data symbol x and the same modulated data symbol x is mapped onto two resource elements. The serving eNB 902 may apply a direction vector $v_1$ to the modulated data symbol $x_1$ resulting in phase rotations of both the modulated data symbol by $v_{11}$ and the duplicated modulated data symbol by $v_{12}$. The difference in the applied phase rotations is as shown by the direction arrow 910. The interfering eNB 904 may apply a direction vector $v_2$ to the modulated data symbol $x_2$ resulting in phase rotations of both the modulated data symbol by $v_{21}$ and the duplicated modulated data symbol by $v_{22}$. The difference in the applied phase rotations is as shown by the direction arrow 920. The interfering eNB 906 may apply a direction vector $v_3$ to the modulated data symbol $x_3$ resulting in phase rotations of both the modulated data symbol by $v_{31}$ and the duplicated modulated data symbol by $v_{32}$. The difference in the applied phase rotations is as shown by the direction arrow 930. The UEs 908, 910, 912 receive the data transmissions 942, 944, 946 from the eNBs 902, 904, 906, respectively. The data transmissions 944, 946 are sent by the eNBs 904, 906, respectively, to UEs being served by the eNBs 904, 906, but are received as interference by the UEs 908, 910, 912. The arrow directions of each of the received data transmissions represent the sum of (1) the difference in the applied phase rotations and (2) the additional phase rotation due to the channel between the eNBs and the UEs.

Some of the UEs receive the data transmissions 944, 946 with aligned phase or nearly aligned phase from the interfering eNBs 904, 906 and with misaligned phase from the data transmission 942 received from the serving eNB 902. For example, the UE 908 receives the data transmission 944 and the data transmission 946 with near phase alignment, and the phases of the data transmissions 944, 946 are misaligned from the phase of the data transmission 942. Due to the opportunistic alignment of interference from the eNBs 904, 906, the interference misalignment with the phase of the data transmission 942, and the power gain of the received signal, if the eNB 902 were to select the UE 908 for the data transmission 942, the UE 908 would be able to cancel the interfering data transmissions 944, 946 from the data transmission 942 using a filter (such as an MMSE filter, a maximal ratio-combining matched filter, or another type of filter) and based on the determined mapping by the serving eNB 902 and interfering eNBs 904, 906; the pseudo-random phase rotations applied by each of the serving eNB 902, interfering eNB 904, and interfering eNB 906; and the received pilot signals and/or additionally received pilot signals.

As discussed supra, one modulated data symbol may be mapped to two data symbols in two different resource elements. Generally, the serving eNB 920 may apply a linear mapping of x modulated symbols to y modulated symbols, where y>x. Each symbol need not be repeated the same number of times. In one configuration, y=2x and therefore the modulated data symbols are duplicated. For the MIMO configuration, the serving eNB 902 duplicates the modulated data symbols not through a mapping of modulated data symbols onto resource elements, but through the transmission of the same modulated data symbols through a plurality of transmit antennas, each with a predetermined pseudo-random phase rotation known a priori to the receiving UE. As shown in FIG. 9, the UE 908 has an opportunistic alignment of interference from the eNBs 904, 906 and an interference misalignment with the phase of the data transmission 942. However, multiple UEs may have such an opportunistic interference alignment. The serving eNB 902 may select a set of UEs that achieve the best opportunistic alignment of interference from the data transmissions 944, 946 and interference misalignment with the phase of the data transmission 942. Alternatively or in addition, the serving eNB 902 may select a set of UEs that would benefit most from the opportunistic alignment scheme, such as cell-edge UEs that normally have a low SINR without use of the scheme. As such, the serving eNB 902 may map data streams for a plurality of UEs using the methods described supra.

Figure 10:
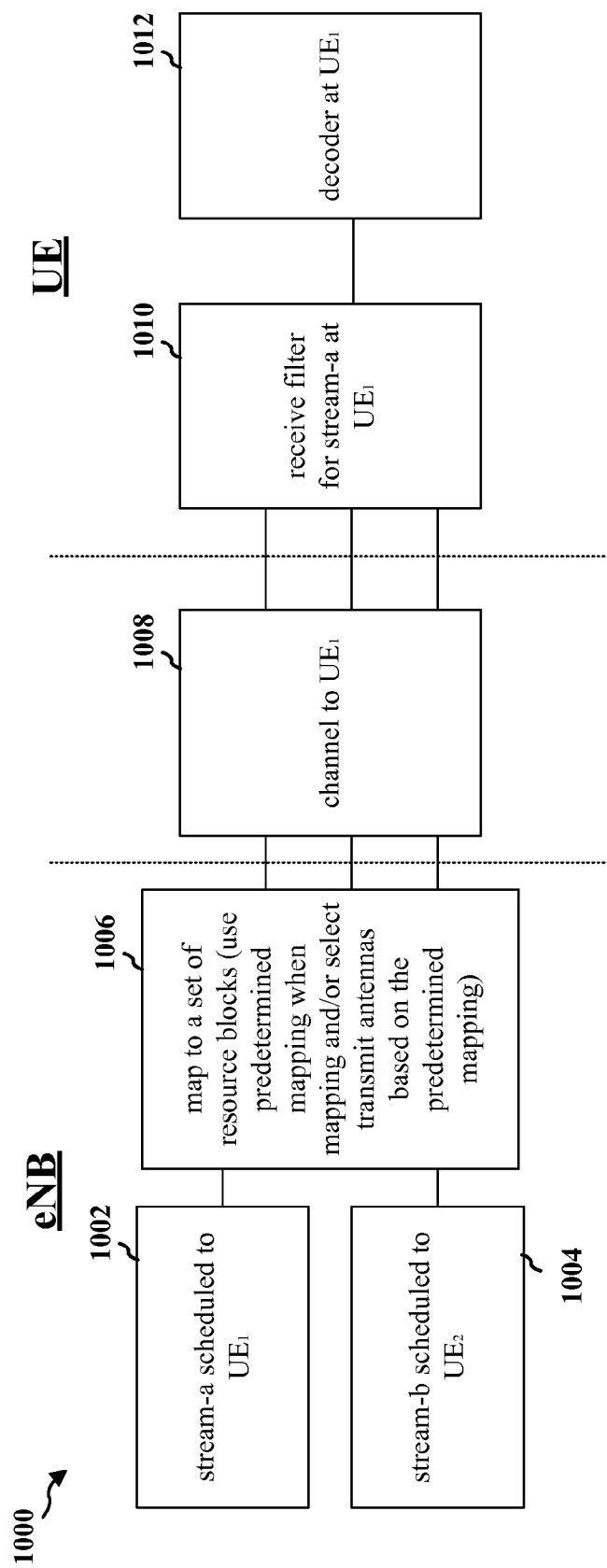
FIG. 10 is a block diagram for illustrating exemplary methods.

FIG. 10 is a block diagram 1000 for illustrating exemplary methods. The eNB maps 1006 stream-a scheduled to $UE_1$ 1002 and stream-b scheduled to $UE_2$ 1004 to a set of resource blocks. In a first configuration, the eNB may use a predetermined mapping known a priori to the UEs to map the streams to the set of resource blocks. In a second configuration, the eNB may use a predetermined mapping known a priori to the UEs to select transmit antennas (or a number of transmit antennas) for transmitting the data streams. For any particular subframe, the predetermined mapping may dictate which resource blocks (e.g., subcarrier range) carry the data stream. The predetermined mapping may also dictate which resource elements are adjusted by each of the predetermined pseudo-random phase rotations known a priori by the UEs. The eNB transmits the modulated and phase rotated data symbols in the set of resource blocks to the $UE_1$. The channel 1008 applies a further phase rotation to the transmission. The UE receives the data transmission and passes the data transmission through a receive filter for stream-a 1010. The receive filter may be an MMSE filter, a maximal ratio-combining matched filter, or another type of filter. The filter may have inputs including the predetermined mapping used by each of the serving eNB and interfering eNBs, the predetermined pseudo-random phase rotations applied by each of the serving eNB and the interfering eNBs, and the received pilot signals and/or additionally received pilot signals from each of the serving eNB and interfering eNBs. The UE then decodes the filtered data stream 1012.

Figure 11:
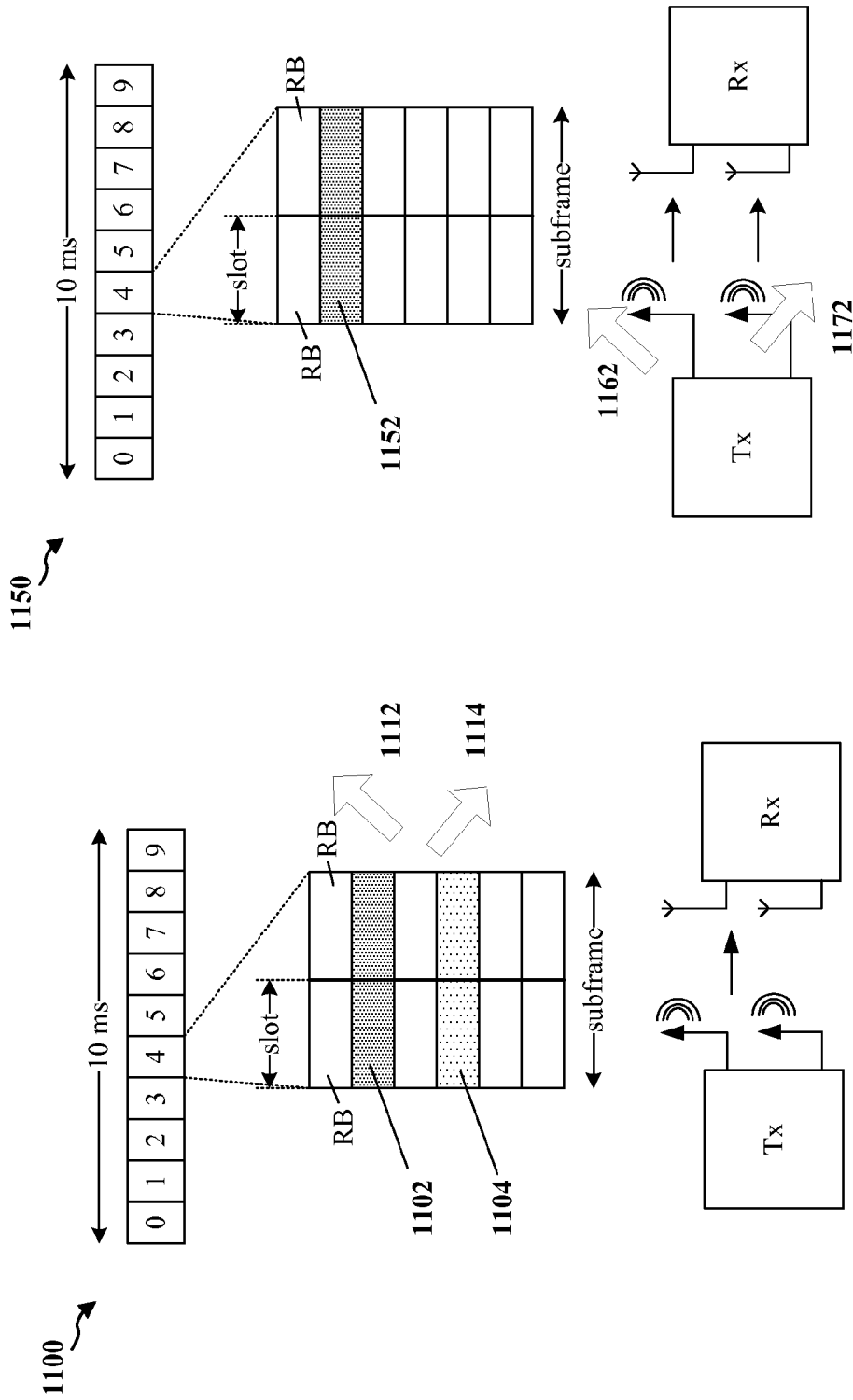
FIG. 11A is a diagram for illustrating a first exemplary method.
FIG. 11B is a diagram for illustrating a second exemplary method.

FIG. 11A is a diagram 1100 for illustrating a first exemplary method. After selecting a set of UEs for a data transmission from the serving eNB that will receive an opportunistic alignment of interference and an interference misalignment with the data transmission, a serving eNB may map a data stream for the set of UEs to a set of resource blocks 1102, 1104. Assume the set of UEs includes one UE. Normally, the serving eNB may map the data stream to just the resource block 1102. However, using the exemplary methods, the serving eNB applies a predetermined mapping to map the data stream not to one resource block 1102, but to both the resource blocks 1102, 1104. When mapping the data stream to the resource block 1102, the serving eNB applies a first predetermined pseudo-random phase rotation 1112 to the modulated data symbols. When mapping the data stream to the resource block 1104, the serving eNB applies a second predetermined pseudo-random phase rotation 1114 to the modulated data symbols. The serving eNB then transmits the modulated data symbols in the resource blocks 1102, 1104 to the UE. In this configuration, the serving eNB may perform beamforming/precoding by repeating the same linear map on each of the transmit antennas, but with different applied phase rotations. The UEs include the impact of having multiple antennas in their channel feedback.

In this example, the predetermined mapping is to duplicate the modulated data symbols from the resource block 1102 to the resource block 1104. Interfering eNBs apply the same linear mapping in the same resource blocks 1102, 1104. Each of the interfering eNBs may apply a different predetermined pseudo-random phase rotation to the modulated data symbols in the resource blocks 1102, 1104. The applied phase rotations are predetermined, as the UE knows a priori what phase rotations will be applied by each of the serving eNB and interfering eNBs. The applied phase rotations may be based on the subframe and/or the system frame number. The applied phase rotations are pseudo-random such that the applied phase rotations hop around in order to allow for an opportunistic alignment of interference from interfering eNBs while the interference misaligns with the data transmission from the serving eNB for any of the UEs being served by the serving eNB. The opportunistic alignment of interference and interference misalignment with the data transmission is determined based on the channel feedback. The linear map may also be time varying and may be changed on a different time scale than the phase rotations. The linear map may be dependent on a predetermined sequence.

FIG. 11B is a diagram 1150 for illustrating a second exemplary method. After selecting a set of UEs for a data transmission from the serving eNB that will receive an opportunistic alignment of interference and an interference misalignment with the data transmission, a serving eNB may map a data stream for the set of UEs to a set of resource blocks 1152. Assume the set of UEs includes one UE. As normally done, the serving eNB may map the data stream to just the resource block 1152. However, using the exemplary methods, the serving eNB applies a predetermined mapping to select a number of transmit antennas (or a set of transmit antennas) for transmitting the modulated data symbols in the resource block 1152. If the predetermined mapping is to duplicate the data stream, the serving eNB may determine to transmit the modulated data symbols from two transmit antennas (each transmit antenna may include multiple antennas) in a MIMO transmission. When transmitting the modulated data symbols for the resource block 1152 from a first transmit antenna, the serving eNB may apply a first phase rotation 1162. When transmitting the same modulated data symbols for the resource block 1152 from a second transmit antenna, the serving eNB may apply a second phase rotation 1172.

In this example, the predetermined mapping is to duplicate the modulated data symbols. Interfering eNBs apply the same linear mapping and therefore also send data transmissions on the resource block 1152 using the same number of transmit antennas. The applied phase rotations are predetermined, as the UE knows a priori what phase rotations will be applied. The applied phase rotation may be based on the subframe and/or the system frame number. The applied phase rotation is pseudo-random such that the applied phase rotations hop around in order to allow for an opportunistic alignment of interference from interfering eNBs while the interference misaligns with the data transmission from the serving eNB for any of the UEs being served by the serving eNB. The opportunistic alignment of interference and interference misalignment with the data transmission is determined based on the channel feedback.

The opportunistic interference alignment scheme can be applied along with CDMA, where multiple UEs share the same OFDM tone through orthogonal or nearly orthogonal codes. CDMA can be applied in the domain of the modulated streams instead of the physical subcarriers. The receiver feedback need not be changed for this. The non-uniform power allocation (assuming fixed total power) can be accounted for by the eNB while selecting UEs. One UE may be selected for each CDMA resource corresponding to each modulation scheme.

I. Mathematical Description

A mathematical description of the opportunistic interference alignment scheme for interference networks follows. The distinguishing feature of this scheme is the lack of the requirement for explicit channel state information at the transmitters. Instead, the scheme uses channel feedback (e.g., CQI, SINR, RSRP, RSRQ, RSSI) from receivers to associated transmitters. This feedback is used to opportunistically schedule receivers with aligned interference directions corresponding to multiple interfering transmitters. The interference direction at any receiver from any interfering stream is the product of the channel matrix between the transmitter and the receiver and the direction vector used by the transmitter for that stream. If the channel matrix is slowly varying, the interference direction can be predicted based on the direction vector used at the transmitter. However, in traditional schemes such as transmit beamforming, the direction vector is varied in time based on feedback, and hence, it is difficult to predict the interference direction. The difficulty in predicting the interference direction is overcome by using predetermined sequences of direction vectors at the transmitters, which are known a priori to all receivers. With predetermined direction vectors at the transmitters, the receiver is expected to mitigate interference through an appropriate receiver combining technique. For performing interference mitigation, each receiver needs to receive the signal and interference in at least two dimensions. The receiver can receive the signal in at least two directions by using two frequency selective resource blocks or MIMO. Because the signal and the interference directions are known, each receiver can compute the net SINR the receiver can obtain using standard receiver combining techniques such as MMSE or minimum interference. This SINR can be determined for multiple future subframes/slots depending on the coherence time of the channel. SINR feedback from associated receivers is used by each transmitter for scheduling. The scheduling decisions can be performed independently by each transmitter. Transmitters can introduce fairness in scheduling by using existing techniques such as proportionally-fair scheduling.

II. System Model

Consider a K-cell wireless network. Every cell has a single transmitter with L associated receivers. Let the number of dimensions used by each transmitter be M and by each receiver be N. Consider quasi-static channels between transmitters and receivers. The discrete-time, $t \in \mathbb{Z}_+$, input-output relation is given by $$y_{i,l}[t] = \sqrt{P} H_{i,i,l} x_i[t] + \sqrt{P^\infty} \Sigma_{j \neq i} H_{i,j,l} x_j[t] + z_{i,l}[t], \quad (1)$$

for all i, j∈K,l∈L. Here, $x_j \in \mathbb{C}^{M \times 1}$ is the signal transmitted by the transmitter in a $j^{th}$ cell, $H_{i,j,l} \in \mathbb{C}^{N \times M}$ is the complex channel matrix from the transmitter in the $j^{th}$ cell to an $l^{th}$ receiver in an $i^{th}$ cell, $z_{i,l} \in \mathbb{C}^{N \times 1}$ is the additive complex Gaussian CN(0, $\sigma^2$I) noise at the $l^{th}$ receiver in the $i^{th}$ cell, and $y_{i,l} \in \mathbb{C}^{N \times 1}$ is the signal received at the $l^{th}$ receiver in the $i^{th}$ cell. In this model, matrix channels could represent frequency or space (MIMO) dimensions in OFDMA systems. Frequency dimensions are modeled by square diagonal channel matrices. This is based on the assumption that the cyclic prefix, which is not explicitly modeled, is sufficiently long. The power constraint at every transmitter is $\mathbb{E}[\|x_j\|^2] \leq 1, \forall j$.

III. Opportunistic Interference Alignment

This section describes an opportunistic interference alignment scheme. The interference direction at any receiver corresponding to any interfering stream is the product of the channel matrix between the transmitter and the receiver and the direction vector used by the transmitter for that stream. Thus, the interference direction can be determined by a receiver if the receiver can estimate the channel matrix and if the receiver knows the direction vector. Predetermined sequences of direction vectors are used at the transmitters so that receivers can obtain this knowledge a priori.

Let the number of streams used by each transmitter be S≤min{M,N}. The S direction vectors used by the transmitter in the $j^{th}$ cell are denoted by $v_{j,s}[t] \in \mathbb{C}^{M \times 1}$, s∈S. These direction vectors are normalized such that $v^*_{j,s}[t] v_{j,s}[t] = 1$. These could be chosen to be orthogonal. The signal transmitted by the transmitter in the $j^{th}$ cell is given by $$x_j[t] = \Sigma_s v_{j,s}[t] q_{j,s}[t], \quad (2)$$

where $q_{j,s}$ is the modulated symbol associated with the (j, s) stream with power constraint $\mathbb{E}[|q_{j,s}|^2] = 1/S$. From now onwards, the time index is suppressed for simplicity.

Consider the $l^{th}$ receiver in the $i^{th}$ cell. The received vector can be written as $$y_{i,l} = \sqrt{P} H_{i,i,l} v_{i,s} q_{i,s} + \Sigma_{s' \neq s} \sqrt{P} H_{i,i,l} v_{i,s'} q_{i,s'} + \sqrt{P^\infty} \Sigma_{j \neq i} H_{i,j,l} v_{j,s} q_{j,s} + z_{i,l}. \quad (3)$$

These received symbols have to be combined. Let the combining vector be denoted by $u_{i,l,s}$. Then, the SINR corresponding to the stream (i, s) at the $l^{th}$ receiver in the $i^{th}$ cell is given by $$\frac{P|u^*_{i,l,s} H_{i,i,l} v_{i,s}|^2}{P \sum_{s' \neq s} |u^*_{i,l,s} H_{i,i,l} v_{i,s'}|^2 + P^\infty \sum_{j \neq i, s'} |u^*_{i,l,s} H_{i,j,l} v_{j,s'}|^2 + \sigma^2 |u^*_{i,l,s} u_{i,l,s}|}. \quad (4)$$

Two methods to obtain the combining vector corresponding to each stream at the receiver are described infra.

A. Minimum Interference

Given that the main issue is interference, a method of interest minimizes the net interference. Hence, the optimization problem of interest in this scenario is $$\min_{u_{i,l,s}:|u^*_{i,l,s} u_{i,l,s}|=1} P \Sigma_{s' \neq s} |u^*_{i,l,s} H_{i,i,l} v_{i,s'}|^2 + P^\infty \Sigma_{j \neq i,s'} |u^*_{i,l,s} H_{i,j,l} v_{j,s'}|^2. \quad (5)$$

The optimal solution for the above minimization is characterized in the following lemma. Lemma 1: Consider the optimization in (5). The optimal solution for this problem is given by $$u_{i,l,s}^{min-int} = f_N([[\sqrt{P} H_{i,i,l} v_{i,s'}]_{s' \neq s} [\sqrt{P^\infty} H_{i,j,l} v_{j,s'}]_{j \neq i,s'}]). \quad (6)$$

where $[\ ]_{j \neq i}$ denotes the matrix formed by all vectors corresponding to j≠i and $f_N$ denotes the $N^{th}$ left singular vector (ordered by decreasing singular value). The proof follows from a variational characterization of singular value decomposition.

B. Maximum SINR

The optimal receiver is the one that maximizes SINR corresponding to that stream. Hence, the optimization problem of interest in this scenario is $$\max_{u_{i,l,s}} \frac{P|u^*_{i,l,s} H_{i,i,l} v_{i,s}|^2}{P \sum_{s' \neq s} |u^*_{i,l,s} H_{i,i,l} v_{i,s'}|^2 + P^\infty \sum_{j \neq i, s'} |u^*_{i,l,s} H_{i,j,l} v_{j,s'}|^2 + \sigma^2 |u^*_{i,l,s} u_{i,l,s}|}. \quad (7)$$

The optimal solution (unique up to scaling) for the maximization in (7) is characterized by the following lemma. Lemma 2: Consider the optimization in (7). For any real value β, the following is an optimal solution:

$$u_{i,l,s}^{max-sin\ r} = \beta(P \Sigma_s H_{i,i,l} v_{i,s} v^*_{i,s} H^*_{i,i,l} + P^\infty \Sigma_{j \neq i,s} H_{i,j,l} v_{j,s} v^*_{j,s} H^*_{i,j,l} + \sigma^2 I)^{-1} H_{i,i,l} v_{i,s}. \quad (8)$$

The proof follows from the optimality of the MMSE receiver.

Given any receiver combining technique, each receiver can compute the SINR corresponding to each stream that the receiver can achieve for future time slots. The receiver uses channel estimates and knowledge of future direction vectors. Then, the receiver sends this channel feedback information to its associated transmitter. Each transmitter uses the channel feedback information to schedule one receiver to each stream. Scheduling can be performed using any fairness criterion such as proportional fairness.

Figure 12:
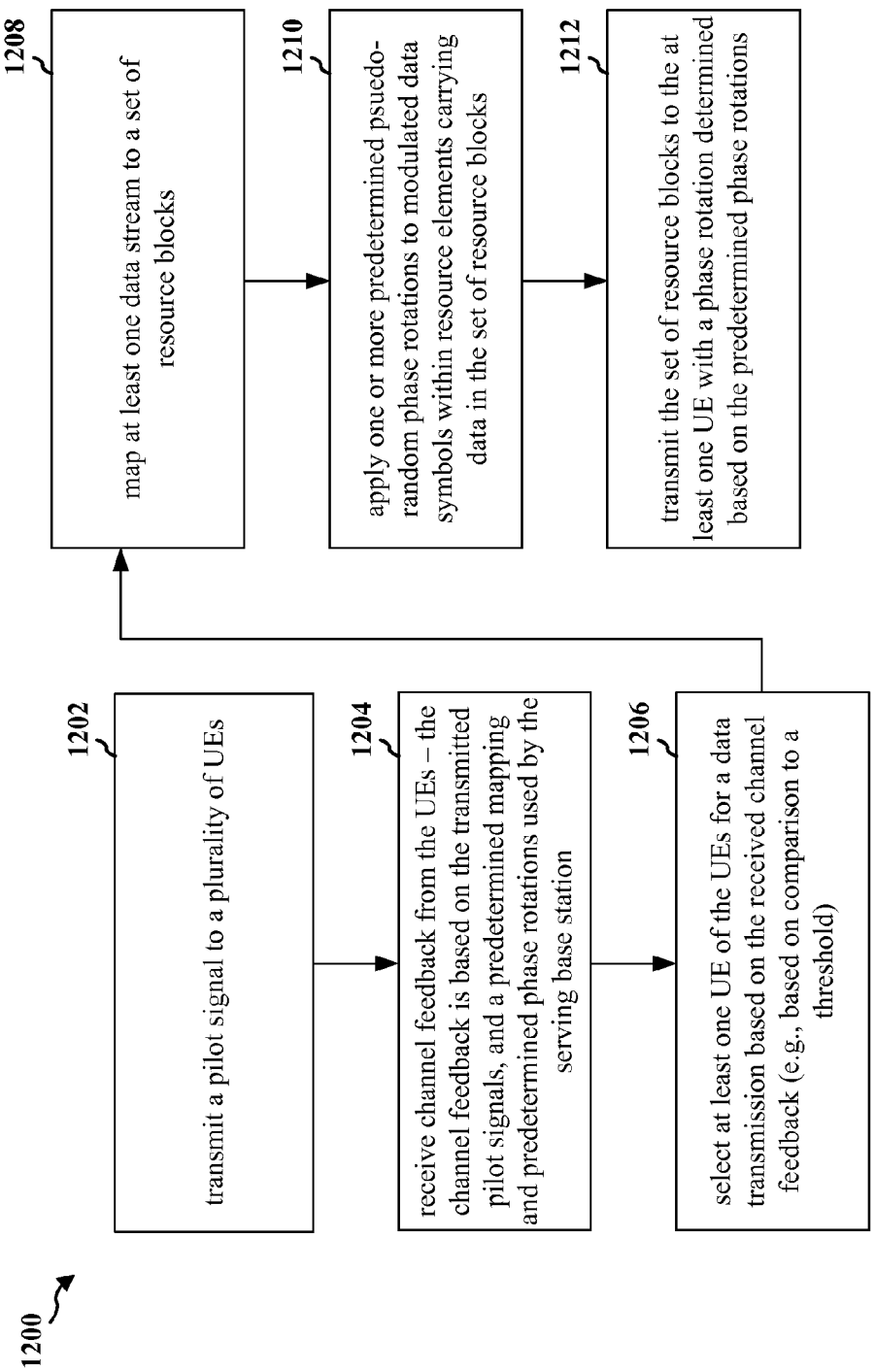
FIG. 12 is a flow chart of a method of wireless communication of a serving base station.

FIG. 12 is a flow chart 1200 of a method of wireless communication of a serving base station. As shown in FIG. 12, in step 1202, the serving base station may transmit a pilot signal to a plurality of UEs. In step 1204, the serving base station receives channel feedback from the UEs. The channel feedback may be based on the transmitted pilot signals, a predetermined mapping used by the serving base station, and predetermined pseudo-random phase rotations used by the serving base station. The channel feedback may also be based on the predetermined pseudo-random phase rotations used by each of the interfering base stations. In step 1206, the serving base station selects at least one UE of the UEs for a data transmission based on the received channel feedback. The serving base station may compare the channel feedback from each of the UEs to a threshold and may select each of the at least one UE based on the channel feedback being greater than the threshold. The serving base station may select the UEs that would benefit most from the scheme. UEs that would benefit most from the scheme are UEs that have a low SINR without the scheme, but a sufficiently high SINR with the scheme. In step 1208, the serving base station maps at least one data stream to a set of resource blocks. In step 1210, the serving base station applies one or more predetermined pseudo-random phase rotations to modulated data symbols within resource elements carrying data in the set of resource blocks. In step 1212, the serving base station transmits the set of resource blocks to the at least one UE with a phase rotation determined based on the predetermined phase rotations.

The serving base station may apply a first predetermined pseudo-random phase rotation to a first subset of resource elements within the set of resource blocks and a second predetermined pseudo-random phase rotation to a second subset of resource elements within the set of resource blocks. For example, referring to FIG. 11A, the serving base station may apply a first phase rotation $\theta_1$ to the modulated data symbols in the resource block 1102 and a second phase rotation $\theta_2$ to the modulated data symbols in the resource block 1104. The serving base station may apply a different predetermined pseudo-random phase rotation to each of a plurality of subsets of the set of resource blocks. For example, $\theta_1$ may be unequal to $\theta_2$. Because the predetermined pseudo-random phase rotations hop around/change to different values over a set of subframes, in subframes $\theta_1$ may be equal to $\theta_2$.

The predetermined mapping is used by the serving base station to map one or more data streams to a set of resource blocks. In one configuration, the serving base station adds redundancy to the one or more data streams when mapping to the set of resource blocks. The one or more data streams normally would be mapped to n resource blocks. However, the serving base station maps the one or more data streams to m resource blocks, where m>n. Accordingly, in the first configuration, the set of resource blocks includes m resource blocks. The predetermined mapping may change over a set of subframes. Accordingly, the subcarriers used for the predetermined mapping, the number of resource blocks used, and/or the amount of redundancy (e.g., mapping two resource blocks to three resource blocks, mapping one resource block to two resource blocks (duplication)) may change every period of subframes. The period may be one or more subframes/frames.

In a first configuration, one resource block is mapped to two resource blocks and therefore the modulated data symbols are duplicated. In such a configuration, m=2n. When the modulated data symbols are duplicated, only half as much data can be transmitted in the resource blocks. However, the duplicated data allows for the UE to receive the data transmission with a power gain and in two directions, which as discussed supra, allows the UE to cancel aligned or nearly aligned interference from the data transmission. When m=2n, the mapped set of resource blocks may include a first set of n resource blocks and a second set of n resource blocks on the same OFDM symbols. The second set of resource blocks may have a pseudo-random phase rotation different than the first set of resource blocks. The serving base station may select the m resource blocks based on a predetermined hopping scheme. The serving base station may use beamforming to send the data transmission and apply a different phase rotation to each simultaneous transmission of the set of resource blocks from a transmit antenna.

In a second configuration, a UE receives the data transmission in at least two directions through the use of MIMO. The serving base station selects a set of transmit antennas based on a predetermined mapping. The set of resource blocks are transmitted from each transmit antenna in the set of transmit antennas with a phase rotation based on the predetermined phase rotations. For example, if the predetermined mapping calls for duplication of the data, the serving base station may select two different transmit antennas (each transmit antenna being a set of antennas), and send the data transmission concurrently through each transmit antenna, but with a different predetermined pseudo-random phase rotation in each transmit antenna. The set of resource blocks may be transmitted with a first predetermined pseudo-random phase rotation from a first transmit antenna and with a second predetermined pseudo-random phase rotation from a second transmit antenna. The set of resource blocks may be transmitted from each transmit antenna of the set of transmit antennas with a different predetermined pseudo-random phase rotation. In this configuration, the channel feedback may be further based on the predetermined mapping used by the serving base station to select the transmit antennas.

Figure 13:
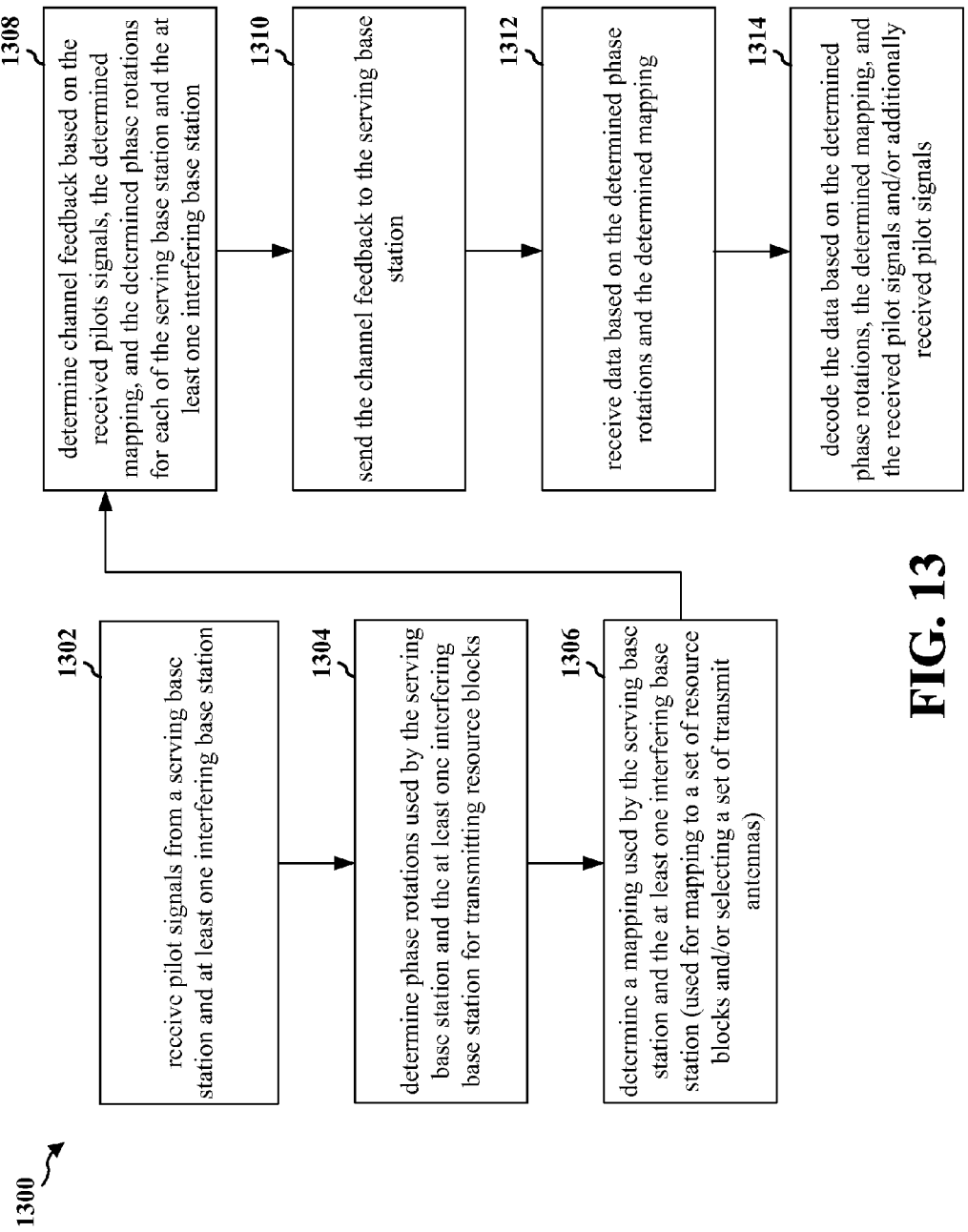
FIG. 13 is a flow chart of a method of wireless communication of a UE.

FIG. 13 is a flow chart 1300 of a method of wireless communication of a UE. As shown in FIG. 13, in step 1302, the UE receives pilot signals from a serving base station and at least one interfering base station. In step 1304, the UE determines phase rotations used by the serving base station and the at least one interfering base station for transmitting resource blocks. In step 1306, the UE determines a mapping used by the serving base station and the at least one interfering base station. The mapping is used to map to a set of resource blocks and/or select a set of transmit antennas. In step 1308, the UE determines channel feedback based on the received pilots signals, the determined mapping, and the determined phase rotations for each of the serving base station and the at least one interfering base station. In step 1310, the UE sends the channel feedback to the serving base station. In step 1312, the UE receives data based on the determined phase rotations and the determined mapping. In step 1314, the UE decodes the data based on the determined mapping, the determined phase rotations, and at least one of the received pilot signals or additionally received pilot signals.

In a first configuration, the UE may determine the mapping used by the serving base station and the at least one interfering base station for mapping to the same set of resource blocks. The UE may receive mapping information from the serving base station indicating the mapping used by the serving base station and the at least one interfering base station for mapping the resource blocks. Alternatively, the mapping and/or the phase rotations for each of the serving base station and the at least one interfering base station may be determined based on at least one of an identifier of the base station (i.e., a transmitter identifier), subcarriers of the utilized resource blocks, or a subframe and/or system frame number in which the mapping or the phase rotations apply.

In a second configuration, the UE may determine a mapping used by the serving base station and the at least one interfering base station for selecting a set of transmit antennas for transmitting a set of resource blocks. The number of transmit antennas in the set of transmit antennas may be the same for both the serving base station and the at least one interfering base station. The UE may receive mapping information from the serving base station indicating the mapping used by the serving base station and the at least one interfering base station for selecting the set of transmit antennas. Alternatively, the mapping and/or the phase rotations for each of the serving base station and the at least one interfering base station may be determined based on at least one of an identifier of the base station (i.e., a transmitter identifier), subcarriers of the utilized resource blocks, or a subframe and/or system frame number in which the mapping or the phase rotations apply.

The opportunistic interference alignment scheme as provided supra provides a power gain and interference reduction to scheduled UEs. The power gain is due to the repetition/duplication of the data. The interference reduction is due to the eNBs applying different phase rotations such that a UE may receive a data transmission from a serving eNB that is misaligned from interference from interfering eNBs while the interference from interfering eNBs are aligned or nearly aligned. The pseudo-random phase rotations introduce variations for the opportunistic serving eNB to exploit, and provide fairness among UEs, especially if channel variations are not time varying or slowly time varying. UEs provide channel feedback based on scheme information known a priori by the UEs. The eNBs may select the UEs that would benefit the most from the scheme, such as UEs that have a low SINR without the scheme, but a sufficiently high SINR with the scheme.

Figure 14:
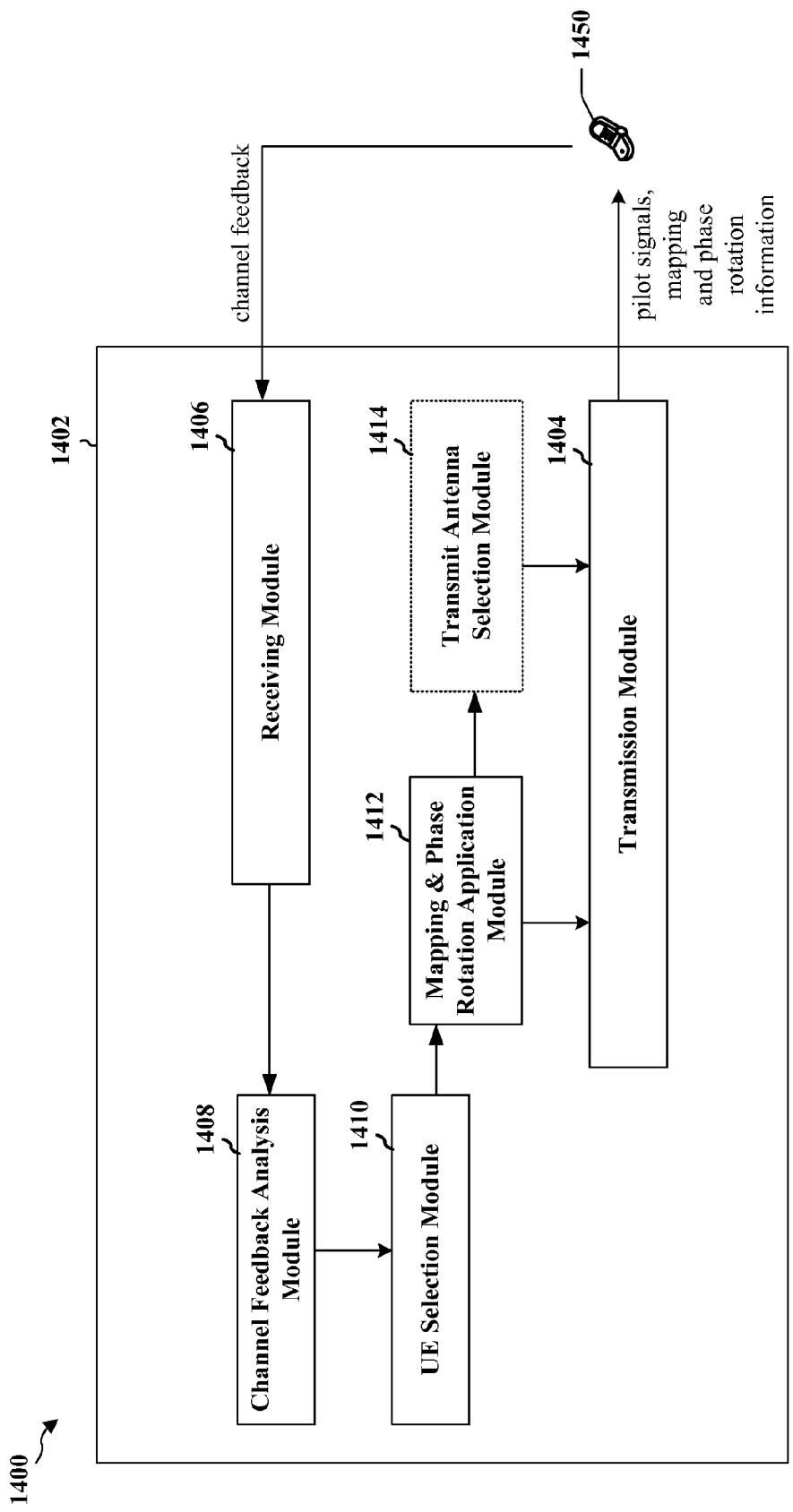
FIG. 14 is a conceptual data flow diagram illustrating the data flow between different modules/means/components in an exemplary base station apparatus.

FIG. 14 is a conceptual data flow diagram 1400 illustrating the data flow between different modules/means/components in an exemplary base station apparatus 1402. The apparatus 1402 includes a receiving module 1406 that is configured to receive channel feedback from a plurality of UEs, including from the UE 1450. The channel feedback is based on predetermined phase rotations used by the serving base station. The channel feedback may be further based on the predetermined phase rotations used by each of the interfering base stations. The receiving module 1406 is configured to provide the channel feedback to a channel feedback analysis module 1408. The channel feedback analysis module 1408 is configured to compare the channel feedback, such as by comparing the channel feedback to a threshold. The channel feedback analysis module 1408 is configured to communicate the results of the analysis to the UE selection module 1410, which is configured to select at least one UE of the UEs for a data transmission based on the received channel feedback. The UE selection module 1410 is configured to communicate the selection to the mapping and phase rotation application module 1412. The mapping and phase rotation application module 1412 is configured to map at least one data stream to a set of resource blocks. The apparatus further includes a transmission module 1404 that is configured to transmit the set of resource blocks to the at least one UE with a phase rotation determined based on the predetermined phase rotations. The transmission module 1404 may be further configured to transmit pilot signals to the UE 1450, and may also be configured to transmit mapping and phase rotation information to the UE 1450 so that the UE 1450 may use this information to determine the channel feedback.

The mapping and phase rotation application module 1412 may be configured to apply a first predetermined pseudo-random phase rotation to a first subset of resource elements within the set of resource blocks and a second predetermined pseudo-random phase rotation to a second subset of resource elements within the set of resource blocks. The mapping and phase rotation application module 1412 may be configured to apply a different predetermined pseudo-random phase rotation to each of a plurality of subsets of the set of resource blocks. The predetermined phase rotations may change over a set of subframes.

In a first configuration, the channel feedback may be further based on a predetermined mapping used by the serving base station to map the at least one data stream to the set of resource blocks. The same predetermined mapping on the same set of resource blocks is used by each of the interfering base stations. In a second configuration, the apparatus 1402 further includes a transmit antenna selection module 1414, which is configured to select a set of transmit antennas based on a predetermined mapping. In such a configuration, the transmission module 1404 transmits the set of resource blocks from each transmit antenna in the set of transmit antennas with a phase rotation based on the predetermined phase rotations.

The apparatus may include additional modules that perform each of the steps of the algorithm in the aforementioned flow chart of FIG. 12. As such, each step in the aforementioned flow chart of FIG. 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 15:
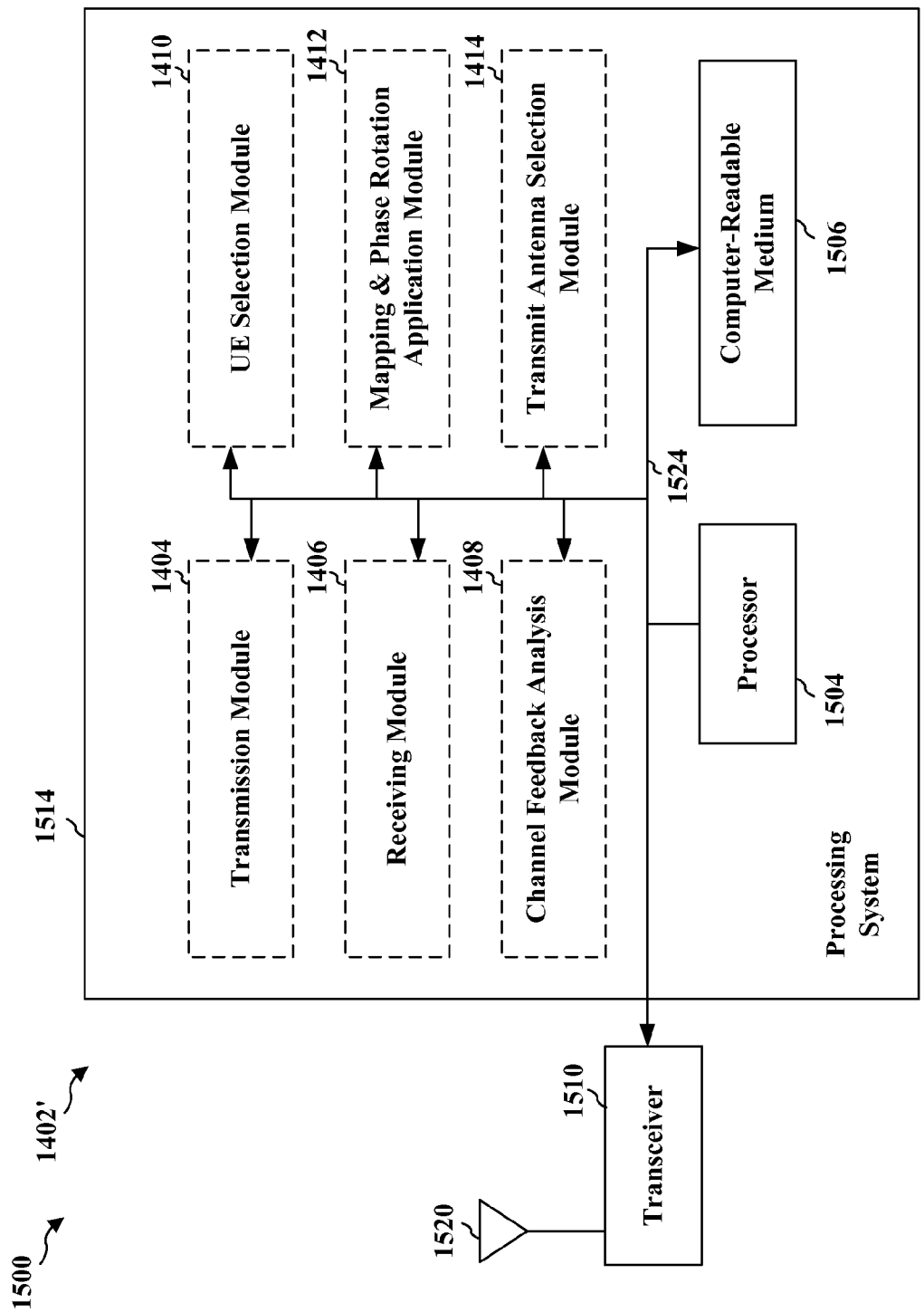
FIG. 15 is a diagram illustrating an example of a hardware implementation for a base station apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, the modules 1404, 1406, 1408, 1410, 1412, 1414, and the computer-readable medium 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the receiving module 1406. In addition, the transceiver 1510 receives information from the processing system 1514, specifically the transmission module 1404, and based on the received information, generates a signal to be applied to the one or more antennas 1520. The processing system 1514 includes a processor 1504 coupled to a computer-readable medium 1506. The processor 1504 is responsible for general processing, including the execution of software stored on the computer-readable medium 1506. The software, when executed by the processor 1504, causes the processing system 1514 to perform the various functions described supra for any particular apparatus. The computer-readable medium 1506 may also be used for storing data that is manipulated by the processor 1504 when executing software. The processing system further includes at least one of the modules 1404, 1406, 1408, 1410, 1412, 1414. The modules may be software modules running in the processor 1504, resident/stored in the computer readable medium 1506, one or more hardware modules coupled to the processor 1504, or some combination thereof. The processing system 1514 may be a component of the eNB 610 and may include the memory 676 and/or at least one of the TX processor 616, the RX processor 670, and the controller/processor 675.

In one configuration, the apparatus 1402/1402' for wireless communication includes means for receiving channel feedback from a plurality of UEs. The channel feedback is based on predetermined phase rotations used by the serving base station. The apparatus further includes means for selecting at least one UE of the UEs for a data transmission based on the received channel feedback. The apparatus further includes means for mapping at least one data stream to a set of resource blocks. The apparatus further includes means for transmitting the set of resource blocks to the at least one UE with a phase rotation determined based on the predetermined phase rotations. The apparatus may further include means for applying a first predetermined pseudo-random phase rotation to a first subset of resource elements within the set of resource blocks and a second predetermined pseudo-random phase rotation to a second subset of resource elements within the set of resource blocks. The apparatus may further include means for applying a different predetermined pseudo-random phase rotation to each of a plurality of subsets of the set of resource blocks. The predetermined phase rotations may change over a set of subframes. The channel feedback may be further based on a predetermined mapping used by the serving base station to map the at least one data stream to the set of resource blocks. The at least one data stream may correspond to n resource blocks and may be mapped to m resource blocks based on the predetermined mapping with m being greater than n. The set of resource blocks may include the m resource blocks. The predetermined mapping may change over a set of subframes. The value m may equal 2n. The mapped set of resource blocks may include a first set of n resource blocks and a second set of n resource blocks on the same symbols. The second set of resource blocks may have a pseudo-random phase rotation different than the first set of resource blocks. The apparatus may further include means for selecting the m resource blocks based on a predetermined hopping scheme. The apparatus may further include means for comparing the channel feedback from each of the UEs to a threshold. Each of the at least one UE may be selected based on the channel feedback being greater than the threshold. The apparatus may further include means for applying a different phase rotation to each simultaneous transmission of the set of resource blocks from a transmit antenna. The apparatus may further include means for transmitting a pilot signal to the UEs, wherein the channel feedback is further based on the transmitted pilot signal. The apparatus may further include means for selecting a set of transmit antennas based on a predetermined mapping. The set of resource blocks may be transmitted from each transmit antenna in the set of transmit antennas with a phase rotation based on the predetermined phase rotations. The set of resource blocks may be transmitted with a first predetermined pseudo-random phase rotation from a first transmit antenna and with a second predetermined pseudo-random phase rotation from a second transmit antenna. The set of resource blocks may be transmitted from each transmit antenna of the set of transmit antennas with a different predetermined pseudo-random phase rotation. The channel feedback may be further based on the predetermined mapping used by the serving base station to select the transmit antennas.

The aforementioned means may be one or more of the aforementioned modules of the apparatus 1402 and/or the processing system 1514 of the apparatus 1402' configured to perform the functions recited by the aforementioned means. As described supra, the processing system 1514 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 16:
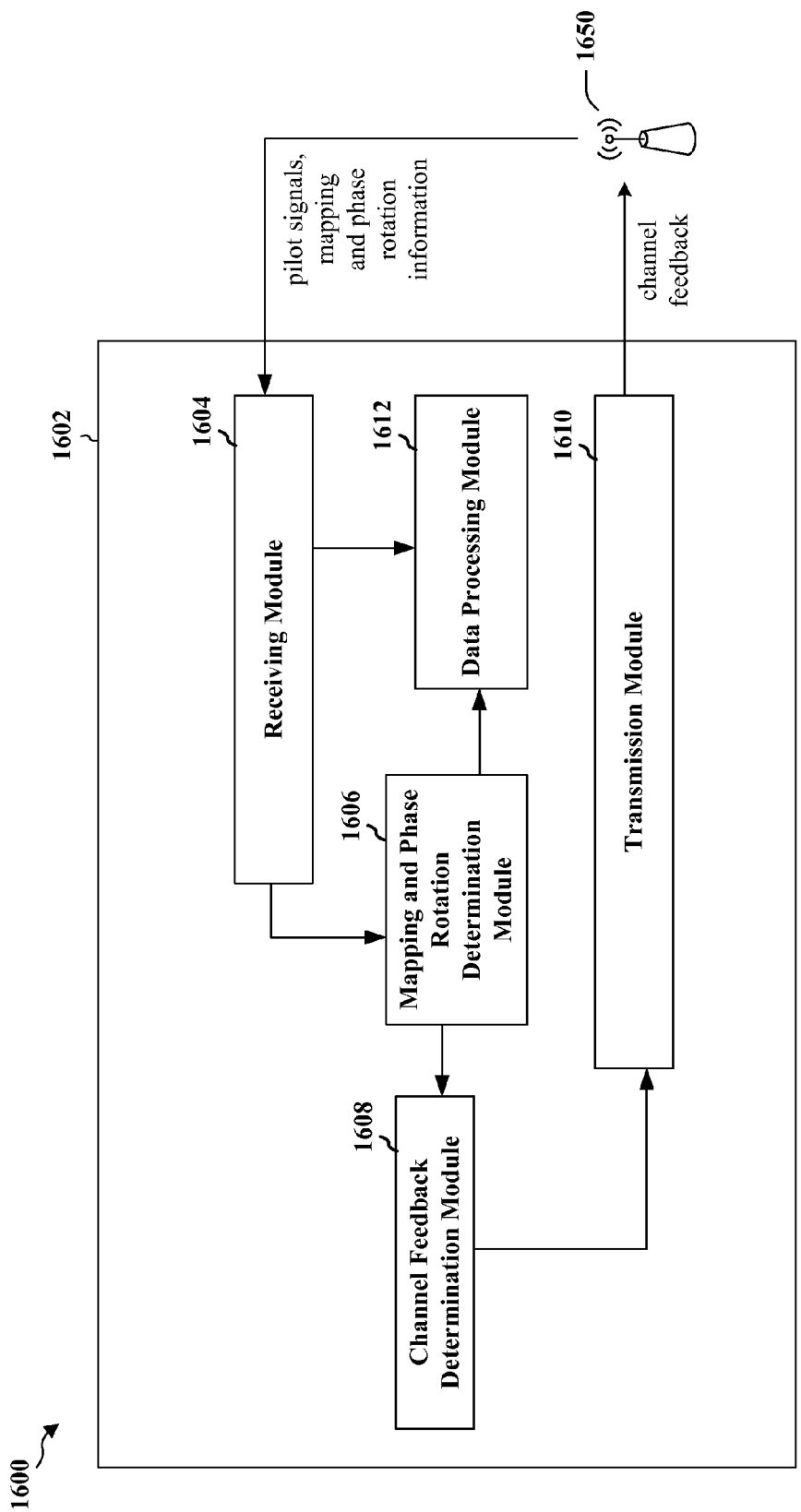
FIG. 16 is a conceptual data flow diagram illustrating the data flow between different modules/means/components in an exemplary UE apparatus.

FIG. 16 is a conceptual data flow diagram 1600 illustrating the data flow between different modules/means/components in an exemplary UE apparatus 1602. The apparatus 1602 includes a receiving module 1604 that is configured to receive pilot signals from a serving base station 1650 and at least one interfering base station. The receiving module 1604 may be further configured to receiving mapping and phase rotation information. The mapping and phase rotation information includes a mapping used by the serving base station 1650 and the at least one interfering base station for mapping to a set of resource blocks, and includes phase rotations to be applied by the serving eNB and the at least one interfering base station to modulated data symbols in the set of resource blocks. The apparatus 1602 further includes a mapping and phase rotation determination module 1606, which is configured to determine phase rotations used by the serving base station and the at least one interfering base station for transmitting resource blocks. The apparatus 1602 further includes a channel feedback determination module 1608 that is configured to determine channel feedback based on the received pilots signals, the determined mapping, and the determined phase rotations for each of the serving base station and the at least one interfering base station. The apparatus 1602 further includes a transmission module that is configured to send the channel feedback to the serving base station 1650. The receiving module 1604 is configured to receive a data transmission based on the determined phase rotations and to provide the received data transmission to the data processing module 1612. The data processing module 1612 is configured to decode the data based on a filter, the determined mapping and phase rotations information, and the pilot signals and/or additionally received pilot signals.

The mapping and phase rotation determination module 1606 may be configured to determine a mapping used by the serving base station and the at least one interfering base station for mapping resource blocks. The mapping by the serving base station 1650 and the at least one interfering base station is to a same set of resource blocks. In one configuration, the apparatus 1602 receives explicit information indicating the mapping used by the serving base station 1650 and the at least one interfering base station. In another configuration, the apparatus 1602 determines the mapping used by the serving base station 1650 and the at least one interfering base station. The apparatus 1602 may determine the mapping based on a transmitter identifier, a subcarrier, or a subframe.

The mapping and phase rotation determination module 1606 may determine a mapping used by the serving base station and the at least one interfering base station for selecting a set of transmit antennas for transmitting a set of resource blocks. The number of transmit antennas in the set of transmit antennas may be the same for both the serving base station and the at least one interfering base station. In one configuration, the apparatus 1602 receives explicit information indicating the mapping used by the serving base station 1650 and the at least one interfering base station. In another configuration, the apparatus 1602 determines the mapping used by the serving base station 1650 and the at least one interfering base station. The apparatus 1602 may determine the mapping based on a transmitter identifier, a subcarrier, or a subframe.

The apparatus may include additional modules that perform each of the steps of the algorithm in the aforementioned flow chart of FIG. 13. As such, each step in the aforementioned flow chart of FIG. 13 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 17:
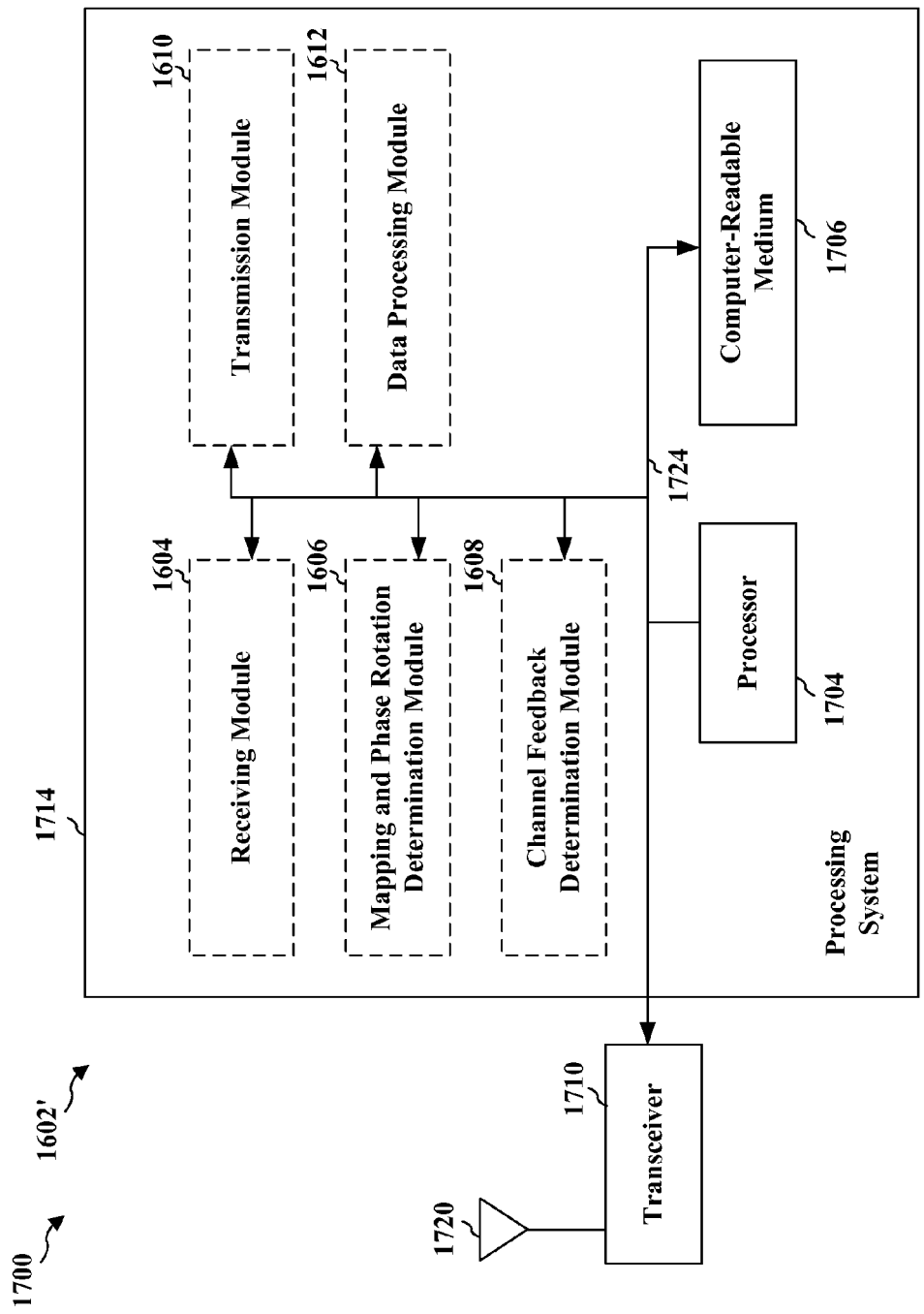
FIG. 17 is a diagram illustrating an example of a hardware implementation for a UE apparatus employing a processing system.

FIG. 17 is a diagram 1700 illustrating an example of a hardware implementation for a UE apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware modules, represented by the processor 1704, the modules 1604, 1606, 1608, 1610, 1612, and the computer-readable medium 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the receiving module 1604. In addition, the transceiver 1710 receives information from the processing system 1714, specifically the transmission module 1610, and based on the received information, generates a signal to be applied to the one or more antennas 1720. The processing system 1714 includes a processor 1704 coupled to a computer-readable medium 1706. The processor 1704 is responsible for general processing, including the execution of software stored on the computer-readable medium 1706. The software, when executed by the processor 1704, causes the processing system 1714 to perform the various functions described supra for any particular apparatus. The computer-readable medium 1706 may also be used for storing data that is manipulated by the processor 1704 when executing software. The processing system further includes at least one of the modules 1604, 1606, 1608, 1610, 1612. The modules may be software modules running in the processor 1704, resident/stored in the computer readable medium 1706, one or more hardware modules coupled to the processor 1704, or some combination thereof. The processing system 1714 may be a component of the UE 650 and may include the memory 660 and/or at least one of the TX processor 668, the RX processor 656, and the controller/processor 659.

In one configuration, the apparatus 1602/1602' for wireless communication includes means for receiving pilot signals from a serving base station and at least one interfering base station, means for determining phase rotations used by the serving base station and the at least one interfering base station for transmitting resource blocks, means for determining channel feedback based on the received pilots signals and the determined phase rotations for each of the serving base station and the at least one interfering base station, means for sending the channel feedback to the serving base station, and means for receiving data based on the determined phase rotations. The apparatus may further include means for determining a mapping used by the serving base station and the at least one interfering base station for mapping resource blocks. The mapping by the serving base station and the at least one interfering base station may be to a same set of resource blocks. The channel feedback may be further based on the determined mapping and the data is received on the set of resource blocks based on the determined mapping. The apparatus may further include means for decoding the data based on the determined mapping, the determined phase rotations, and at least one of the received pilot signals or additionally received pilot signals. The apparatus may further include means for receiving mapping information from the serving base station indicating the mapping used by the serving base station and the at least one interfering base station for mapping the resource blocks. At least one of the mapping or the phase rotations for each of the serving base station and the at least one interfering base station may be determined based on at least one of a transmitter identifier, a subcarrier, or a subframe. The apparatus may further include means for determining a mapping used by the serving base station and the at least one interfering base station for selecting a set of transmit antennas for transmitting a set of resource blocks. A number of transmit antennas in the set of transmit antennas may be the same for both the serving base station and the at least one interfering base station. The channel feedback may be further based on the determined mapping and the data is received on the set of resource blocks based on the determined mapping. The apparatus may further include means for decoding the data based on the determined mapping, the determined phase rotations, and at least one of the received pilot signals or additionally received pilot signals. The apparatus may further include means for receiving mapping information from the serving base station indicating the mapping used by the serving base station and the at least one interfering base station for selecting the set of transmit antennas. At least one of the mapping or the phase rotations for each of the serving base station and the at least one interfering base station may be determined based on at least one of a transmitter identifier, a subcarrier, or a subframe. The determined phase rotations for the serving base station may be different from the determined phase rotations for the at least one interfering base station.

The aforementioned means may be one or more of the aforementioned modules of the apparatus 1602 and/or the processing system 1714 of the apparatus 1602' configured to perform the functions recited by the aforementioned means. As described supra, the processing system 1714 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a serving base station, comprising:
   receiving channel feedback from a plurality of user equipments (UEs), the channel feedback being based on predetermined phase rotations used by the serving base station and by at least one interfering base station;
   selecting at least one UE of the UEs for a data transmission based on the received channel feedback that is based on predetermined phase rotations used by the serving base station and by the at least one interfering base station;
   mapping at least one data stream to a set of resource blocks; and
   transmitting the set of resource blocks to the at least one UE with a phase rotation determined based on the predetermined phase rotations used by the serving base station.

2. The method of claim 1, further comprising applying a first predetermined pseudo-random phase rotation to a first subset of resource elements within the set of resource blocks and a second predetermined pseudo-random phase rotation to a second subset of resource elements within the set of resource blocks.

3. The method of claim 1, further comprising applying a different predetermined pseudo-random phase rotation to each of a plurality of subsets of the set of resource blocks.

4. The method of claim 1, wherein the predetermined phase rotations change over a set of subframes.

5. The method of claim 1, further comprising comparing the channel feedback from each of the UEs to a threshold, wherein each of the at least one UE is selected based on the channel feedback being greater than the threshold.

6. The method of claim 1, further comprising applying a different phase rotation to each simultaneous transmission of the set of resource blocks from a transmit antenna.

7. The method of claim 1, further comprising transmitting a pilot signal to the UEs, wherein the channel feedback is further based on the transmitted pilot signal.

8. A method of wireless communication of a serving base station, comprising:
   receiving channel feedback from a plurality of user equipments (UEs), the channel feedback being based on predetermined phase rotations used by the serving base station;
   selecting at least one UE of the UEs for a data transmission based on the received channel feedback;
   mapping at least one data stream to a set of resource blocks; and
   transmitting the set of resource blocks to the at least one UE with a phase rotation determined based on the predetermined phase rotations, wherein the channel feedback is further based on a predetermined mapping used by the serving base station to map the at least one data stream to the set of resource blocks, the at least one data stream corresponds to n resource blocks and is mapped to m resource blocks based on the predetermined mapping, m is greater than n, and the set of resource blocks comprise the m resource blocks.

9. The method of claim 8, wherein the predetermined mapping changes over a set of subframes.

10. The method of claim 8, wherein m equals 2n.

11. The method of claim 10, wherein the mapped set of resource blocks comprise a first set of n resource blocks and a second set of n resource blocks on the same symbols, the second set of resource blocks having a pseudo-random phase rotation different than the first set of resource blocks.

12. The method of claim 8, further comprising selecting the m resource blocks based on a predetermined hopping scheme.

13. A method of wireless communication of a serving base station, comprising:
   receiving channel feedback from a plurality of user equipments (UEs), the channel feedback being based on predetermined phase rotations used by the serving base station;
   selecting at least one UE of the UEs for a data transmission based on the received channel feedback;
   mapping at least one data stream to a set of resource blocks;
   selecting a set of transmit antennas based on a predetermined mapping; and
   transmitting the set of resource blocks to the at least one UE with a phase rotation determined based on the predetermined phase rotations, wherein the set of resource blocks is transmitted from each transmit antenna in the set of transmit antennas with a phase rotation based on the predetermined phase rotations.

14. The method of claim 13, wherein the set of resource blocks is transmitted with a first predetermined pseudo-random phase rotation from a first transmit antenna and with a second predetermined pseudo-random phase rotation from a second transmit antenna.

15. The method of claim 13, wherein the set of resource blocks is transmitted from each transmit antenna of the set of transmit antennas with a different predetermined pseudo-random phase rotation.

16. The method of claim 13, wherein the channel feedback is further based on the predetermined mapping used by the serving base station to select the transmit antennas.

17. A serving base station for wireless communication, comprising:
   means for receiving channel feedback from a plurality of user equipments (UEs), the channel feedback being based on predetermined phase rotations used by the serving base station and by at least one interfering base station;
   means for selecting at least one UE of the UEs for a data transmission based on the received channel feedback that is based on predetermined phase rotations used by the serving base station and by the at least one interfering base station;
   means for mapping at least one data stream to a set of resource blocks; and
   means for transmitting the set of resource blocks to the at least one UE with a phase rotation determined based on the predetermined phase rotations used by the serving base station.

18. The serving base station of claim 17, further comprising means for applying a first predetermined pseudo-random phase rotation to a first subset of resource elements within the set of resource blocks and a second predetermined pseudo-random phase rotation to a second subset of resource elements within the set of resource blocks.

19. The serving base station of claim 17, further comprising means for applying a different predetermined pseudo-random phase rotation to each of a plurality of subsets of the set of resource blocks.

20. The serving base station of claim 17, wherein the predetermined phase rotations change over a set of subframes.

21. The serving base station of claim 17, further comprising means for comparing the channel feedback from each of the UEs to a threshold, wherein each of the at least one UE is selected based on the channel feedback being greater than the threshold.

22. The serving base station of claim 17, further comprising means for applying a different phase rotation to each simultaneous transmission of the set of resource blocks from a transmit antenna.

23. The serving base station of claim 17, further comprising means for transmitting a pilot signal to the UEs, wherein the channel feedback is further based on the transmitted pilot signal.

24. A serving base station for wireless communication, comprising:
    means for receiving channel feedback from a plurality of user equipments (UEs), the channel feedback being based on predetermined phase rotations used by the serving base station;
    means for selecting at least one UE of the UEs for a data transmission based on the received channel feedback;
    means for mapping at least one data stream to a set of resource blocks; and
    means for transmitting the set of resource blocks to the at least one UE with a phase rotation determined based on the predetermined phase rotations, wherein the channel feedback is further based on a predetermined mapping used by the serving base station to map the at least one data stream to the set of resource blocks, the at least one data stream corresponds to n resource blocks and is mapped to m resource blocks based on the predetermined mapping, m is greater than n, and the set of resource blocks comprise the m resource blocks.

25. The serving base station of claim 24, wherein the predetermined mapping changes over a set of subframes.

26. The serving base station of claim 24, wherein m equals 2n.

27. The serving base station of claim 26, wherein the mapped set of resource blocks comprise a first set of n resource blocks and a second set of n resource blocks on the same symbols, the second set of resource blocks having a pseudo-random phase rotation different than the first set of resource blocks.

28. The serving base station of claim 24, further comprising means for selecting the m resource blocks based on a predetermined hopping scheme.

29. A serving base station for wireless communication, comprising:
    means for receiving channel feedback from a plurality of user equipments (UEs), the channel feedback being based on predetermined phase rotations used by the serving base station;
    means for selecting at least one UE of the UEs for a data transmission based on the received channel feedback;
    means for mapping at least one data stream to a set of resource blocks;
    means for selecting a set of transmit antennas based on a predetermined mapping; and
    means for transmitting the set of resource blocks to the at least one UE with a phase rotation determined based on the predetermined phase rotations, wherein the set of resource blocks is transmitted from each transmit antenna in the set of transmit antennas with a phase rotation based on the predetermined phase rotations.

30. The serving base station of claim 29, wherein the set of resource blocks is transmitted with a first predetermined pseudo-random phase rotation from a first transmit antenna and with a second predetermined pseudo-random phase rotation from a second transmit antenna.

31. The serving base station of claim 29, wherein the set of resource blocks is transmitted from each transmit antenna of the set of transmit antennas with a different predetermined pseudo-random phase rotation.

32. The serving base station of claim 29, wherein the channel feedback is further based on the predetermined mapping used by the serving base station to select the transmit antennas.

33. A serving base station for wireless communication, comprising:
    a memory; and
    at least one processor coupled to the memory and configured to:
    receive channel feedback from a plurality of user equipments (UEs), the channel feedback being based on predetermined phase rotations used by the serving base station and by at least one interfering base station;
    select at least one UE of the UEs for a data transmission based on the received channel feedback that is based on predetermined phase rotations used by the serving base station and by the at least one interfering base station;
    map at least one data stream to a set of resource blocks; and
    transmit the set of resource blocks to the at least one UE with a phase rotation determined based on the predetermined phase rotations used by the serving base station.

34. The serving base station of claim 33, wherein the at least one processor is further configured to apply a first predetermined pseudo-random phase rotation to a first subset of resource elements within the set of resource blocks and a second predetermined pseudo-random phase rotation to a second subset of resource elements within the set of resource blocks.

35. The serving base station of claim 33, wherein the at least one processor is further configured to apply a different predetermined pseudo-random phase rotation to each of a plurality of subsets of the set of resource blocks.

36. The serving base station of claim 33, wherein the predetermined phase rotations change over a set of subframes.

37. The serving base station of claim 33, wherein the at least one processor is further configured to compare the channel feedback from each of the UEs to a threshold, wherein each of the at least one UE is selected based on the channel feedback being greater than the threshold.

38. The serving base station of claim 33, wherein the at least one processor is further configured to apply a different phase rotation to each simultaneous transmission of the set of resource blocks from a transmit antenna.

39. The serving base station of claim 33, wherein the at least one processor is further configured to transmit a pilot signal to the UEs, wherein the channel feedback is further based on the transmitted pilot signal.

40. A serving base station for wireless communication, comprising:
    a memory; and
    at least one processor coupled to the memory and configured to:
    receive channel feedback from a plurality of user equipments (UEs), the channel feedback being based on predetermined phase rotations used by the serving base station;
    select at least one UE of the UEs for a data transmission based on the received channel feedback;

map at least one data stream to a set of resource blocks; and transmit the set of resource blocks to the at least one UE with a phase rotation determined based on the predetermined phase rotations, wherein the channel feedback is further based on a predetermined mapping used by the serving base station to map the at least one data stream to the set of resource blocks, the at least one data stream corresponds to n resource blocks and is mapped to m resource blocks based on the predetermined mapping, m is greater than n, and the set of resource blocks comprise the m resource blocks.

41. The serving base station of claim 40, wherein the predetermined mapping changes over a set of subframes.

42. The serving base station of claim 40, wherein m equals 2n.

43. The serving base station of claim 42, wherein the mapped set of resource blocks comprise a first set of n resource blocks and a second set of n resource blocks on the same symbols, the second set of resource blocks having a pseudo-random phase rotation different than the first set of resource blocks.

44. The serving base station of claim 40, wherein the at least one processor is further configured to select the m resource blocks based on a predetermined hopping scheme.

45. A serving base station for wireless communication, comprising:

a memory; and at least one processor coupled to the memory and configured to:

receive channel feedback from a plurality of user equipments (UEs), the channel feedback being based on predetermined phase rotations used by the serving base station;

select at least one UE of the UEs for a data transmission based on the received channel feedback;

map at least one data stream to a set of resource blocks;

select a set of transmit antennas based on a predetermined mapping; and transmit the set of resource blocks to the at least one UE with a phase rotation determined based on the predetermined phase rotations, wherein the set of resource blocks is transmitted from each transmit antenna in the set of transmit antennas with a phase rotation based on the predetermined phase rotations.

46. The serving base station of claim 45, wherein the set of resource blocks is transmitted with a first predetermined pseudo-random phase rotation from a first transmit antenna and with a second predetermined pseudo-random phase rotation from a second transmit antenna.

47. The serving base station of claim 45, wherein the set of resource blocks is transmitted from each transmit antenna of the set of transmit antennas with a different predetermined pseudo-random phase rotation.

48. The serving base station of claim 45, wherein the channel feedback is further based on the predetermined mapping used by the serving base station to select the transmit antennas.

49. A non-transitory computer-readable medium associated with a serving base station and storing computer executable code for wireless communication, comprising code for:

receiving channel feedback from a plurality of user equipments (UEs), the channel feedback being based on predetermined phase rotations used by the serving base station and by at least one interfering base station;

selecting at least one UE of the UEs for a data transmission based on the received channel feedback that is based on predetermined phase rotations used by the serving base station and by the at least one interfering base station;

mapping at least one data stream to a set of resource blocks; and transmitting the set of resource blocks to the at least one UE with a phase rotation determined based on the predetermined phase rotations used by the serving base station.

* * * * *